(12) United States Patent
Hassler

(10) Patent No.: US 12,107,909 B2
(45) Date of Patent: *Oct. 1, 2024

(54) METHODS, SYSTEMS, AND APPARATUSES FOR IMPROVED CONTENT DELIVERY

(71) Applicant: Comcast Cable Communications, LLC, Philadelphia, PA (US)

(72) Inventor: Garey Hassler, Castle Pines, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/140,811

(22) Filed: Apr. 28, 2023

(65) Prior Publication Data

US 2023/0344887 A1 Oct. 26, 2023

Related U.S. Application Data

(63) Continuation of application No. 17/679,951, filed on Feb. 24, 2022, now Pat. No. 11,677,795, which is a (Continued)

(51) Int. Cl.
*H04L 65/613* (2022.01)
*H04L 43/106* (2022.01)
(Continued)

(52) U.S. Cl.
CPC .......... *H04L 65/613* (2022.05); *H04L 43/106* (2013.01); *H04L 43/16* (2013.01);
(Continued)

(58) Field of Classification Search
CPC ..... H04L 65/613; H04L 43/106; H04L 43/16; H04L 65/65; H04L 41/0893; H04L 41/5025; H04L 43/0888; H04L 43/091; H04L 65/612; H04L 43/0811; H04L 65/1083; H04L 65/80; H04N 21/25841;
(Continued)

(56) References Cited

U.S. PATENT DOCUMENTS 9,628,405 B2 * 4/2017 Dasher ............... H04N 21/2662
10,958,700 B1 3/2021 Hassler
(Continued)

OTHER PUBLICATIONS

U.S. Appl. No. 17/679,951 (2022/0255977), filed Feb. 24, 2022 (Aug. 11, 2022), Garey Hassler (Comcast Cable Communications, LLC).
(Continued)

*Primary Examiner* — Jonathan A Bui
(74) *Attorney, Agent, or Firm* — Ballard Spahr LLP

(57) ABSTRACT

Methods, systems, and apparatuses for improved content delivery are described herein. During delivery of content to one or more user devices of a content distribution network (CDN), a content session may be created for each user device. During each content session, each user device may send one or more upstream communications, such as heartbeat signals and bitrate requests, to the CDN. A monitoring module of the CDN may aggregate the upstream communications into session data. The monitoring module may use the session data to determine an impairment associated with content delivery to the one or more user devices.

24 Claims, 11 Drawing Sheets

Related U.S. Application Data continuation of application No. 17/175,323, filed on Feb. 12, 2021, now Pat. No. 11,297,119, which is a continuation of application No. 16/790,416, filed on Feb. 13, 2020, now Pat. No. 10,958,700.

(51) Int. Cl.

| | |
|---|---|
| *H04L 43/16* | (2022.01) |
| *H04L 65/65* | (2022.01) |
| *H04N 21/258* | (2011.01) |
| *H04N 21/2662* | (2011.01) |

(52) U.S. Cl.
CPC ....... *H04L 65/65* (2022.05); *H04N 21/25841* (2013.01); *H04N 21/2662* (2013.01)

(58) Field of Classification Search
CPC ........... H04N 21/2662; H04N 21/2408; H04N 21/4425; H04N 21/6582
See application file for complete search history.

(56) References Cited

U.S. PATENT DOCUMENTS

| | | | |
|---|---|---|---|
| 11,297,119 B2 | 4/2022 | Hassler | |
| 11,677,795 B2* | 6/2023 | Hassler | H04N 21/2408 |
| | | | 709/231 |
| 2014/0189793 A1* | 7/2014 | Kim | H04L 63/0853 |
| | | | 726/3 |
| 2015/0150070 A1 | 5/2015 | Gibbon et al. | |
| 2018/0007435 A1 | 1/2018 | Beattie, Jr. et al. | |
| 2020/0099733 A1 | 3/2020 | Chu et al. | |
| 2020/0396031 A1* | 12/2020 | Zhang | H04L 5/0044 |

OTHER PUBLICATIONS

U.S. Appl. No. 17/175,323 (U.S. Pat. No. 11,297,119), filed Feb. 12, 2021 (Apr. 5, 2022,) Garey Hassler (Comcast Cable Communications, LLC).

U.S. Appl. No. 16/790,416 (U.S. Pat. No. 10,958,700), filed Feb. 13, 2020 (Mar. 23, 2021), Garey Hassler (Comcast Cable Communications, LLC).

* cited by examiner

300 ↘

| | | |
|---|---|---|
| Session id | | 362786d5-4b0d-493c-93f7-d36a1934f236 302 |
| Session duration ( milli seconds ) | 303 | 912614 |
| Asset class | 304 | Linear |
| Device Model | 306 | STB-Xg1v3 |
| streamId | | 6119897543691112163 |

Total Events break down — Total Events

| | |
|---|---|
| xuaPlayStateChanged | 18 |
| xuaHeartBeat | 308 10 |
| xuaOpeningMedia | 1 |
| xuaBitrateChanged | 310 108 |
| xuaTrickPlay | 14 | xuaHeartBeat event is considered for Avg bitrate

| bitrate at each heartbeat event 312 | timestamp(epoch) 314 |
|---|---|
| 946400 | 1550623916237 |
| 2224800 | 1550624088086 |
| 2224800 | 1550624129647 |
| 946400 | 1550624184977 |
| 3835600 | 1550624229358 |
| 2224800 | 1550624555354 |
| 946400 | 1550624589346 |
| 313200 | 1550624667742 |
| 689200 | 1550624729175 |
| 3835600 | 1550624770307 |

FIG. 3

METHODS, SYSTEMS, AND APPARATUSES FOR IMPROVED CONTENT DELIVERY

CROSS REFERENCE TO RELATED PATENT APPLICATION

This application claims priority under 35 U.S.C. § 120 to, and is a continuation of U.S. patent application Ser. No. 17/679,951, filed Feb. 24, 2022, which is a continuation of U.S. patent application Ser. No. 17/175,323, filed on Feb. 12, 2021, now U.S. Pat. No. 11,297,119, which is a continuation of U.S. patent application Ser. No. 16/790,416, filed on Feb. 13, 2020, now U.S. Pat. No. 10,958,700, the entire contents of each of which are hereby incorporated herein by reference in their entirety for all purposes.

BACKGROUND

The quality of content delivered through a content distribution network may be affected by various network-related constraints. At times when content is being requested by a large number of user devices, some user devices may be forced to frequently adjust the quality level of content due to processing errors, deployment schemes, and other network-related constraints. These and other considerations are addressed by the present description.

SUMMARY

It is to be understood that both the following general description and the following detailed description are exemplary and explanatory only and are not restrictive. Methods, systems, and apparatuses for improved content delivery are described herein. During content delivery to one or more user devices of a content distribution network (CDN), a content session may be created for each user device. During each content session, the user devices may send one or more upstream communications. The upstream communications may include an indication that the content session is still active (e.g., a "heartbeat" signal). The upstream communications may also include one or more requests for content to be delivered at a different bitrate. The user devices may send the one or more requests for the content to be delivered at a different bitrate due to an impairment in the CDN.

In order to provide optimal and consistent content quality, the CDN may include a monitoring and analytics (M&A) module that aggregates the upstream communications into session data. The session data may indicate a quantity of heartbeat signals sent by the user devices to the CDN while a content session is ongoing. The session data may also indicate a quantity of requests for a different bitrate of content during the content session.

The M&A module may use the session data to determine an impairment associated with content delivery to the user devices. For example, the M&A module may determine that a quantity of requests for a different bitrate of content during the content session exceeds a threshold, indicating an impairment. The M&A module may be configured to determine at least one source of the impairment that may have caused the user devices to be forced to change the requested bitrate of the content. For example, the user devices may be requesting a same content item, and the M&A module may determine whether the quantity of requests for different bitrates are sent by the user devices within a specified frequency such that the timing of the requests are substantially aligned. The M&A module may determine that substantially aligned bitrate requests for a same content item are indicative of an impairment related to packaging and/or transcoding of the content item by the CDN. As another example, the user devices may be requesting a same content item, and the M&A module may determine that the bitrate requests are not substantially aligned. The M&A module may determine that substantially un-aligned bitrate requests for the same content item are indicative of an impairment related to network congestion associated with the CDN, and/or physical impairments associated with the CDN.

As another example, the at least one source of the impairment may be related to a deployment scheme of the CDN (e.g., a delivery protocol). For example, the user devices may be associated with two or more service groups. The user devices of each service group may be requesting different content items, and the M&A module may determine whether the quantity of requests across the two or more service groups are substantially aligned. The M&A module may determine that substantially aligned bitrate requests for different content items across two or more service groups are indicative of an impairment related to a deployment scheme of the CDN associated with both of the service groups (e.g., a regional impairment). As a further example, the user devices of each service group may be requesting different content items, and the M&A module may determine that the bitrate requests are not substantially aligned. The M&A module may determine that substantially un-aligned bitrate requests for different content items across two or more service groups are indicative of an impairment related to a deployment scheme of the CDN that may not affect all of the service groups (e.g., a sub-regional impairment).

The M&A module may collect and aggregate upstream communications from a large group of user devices, such as those within a geographic region (e.g., a state), a class of users, etc., into session data. The M&A module may determine, based on the session data, that a subset of the group of user devices, such as those within a geographic sub-region (e.g., a city), are being affected by an impairment. The M&A module may determine, based on the session data, that another subset(s) of the group of user devices, such as those within a different sub-region (e.g., another city), are not being affected by an impairment. In this way, the M&A module, and the CDN overall, may be able to more effectively identify the at least one source of the impairment.

This summary is not intended to identify critical or essential features of the present description, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the methods and systems described herein:

FIG. 3 shows example session data;

DETAILED DESCRIPTION

Figure 1:
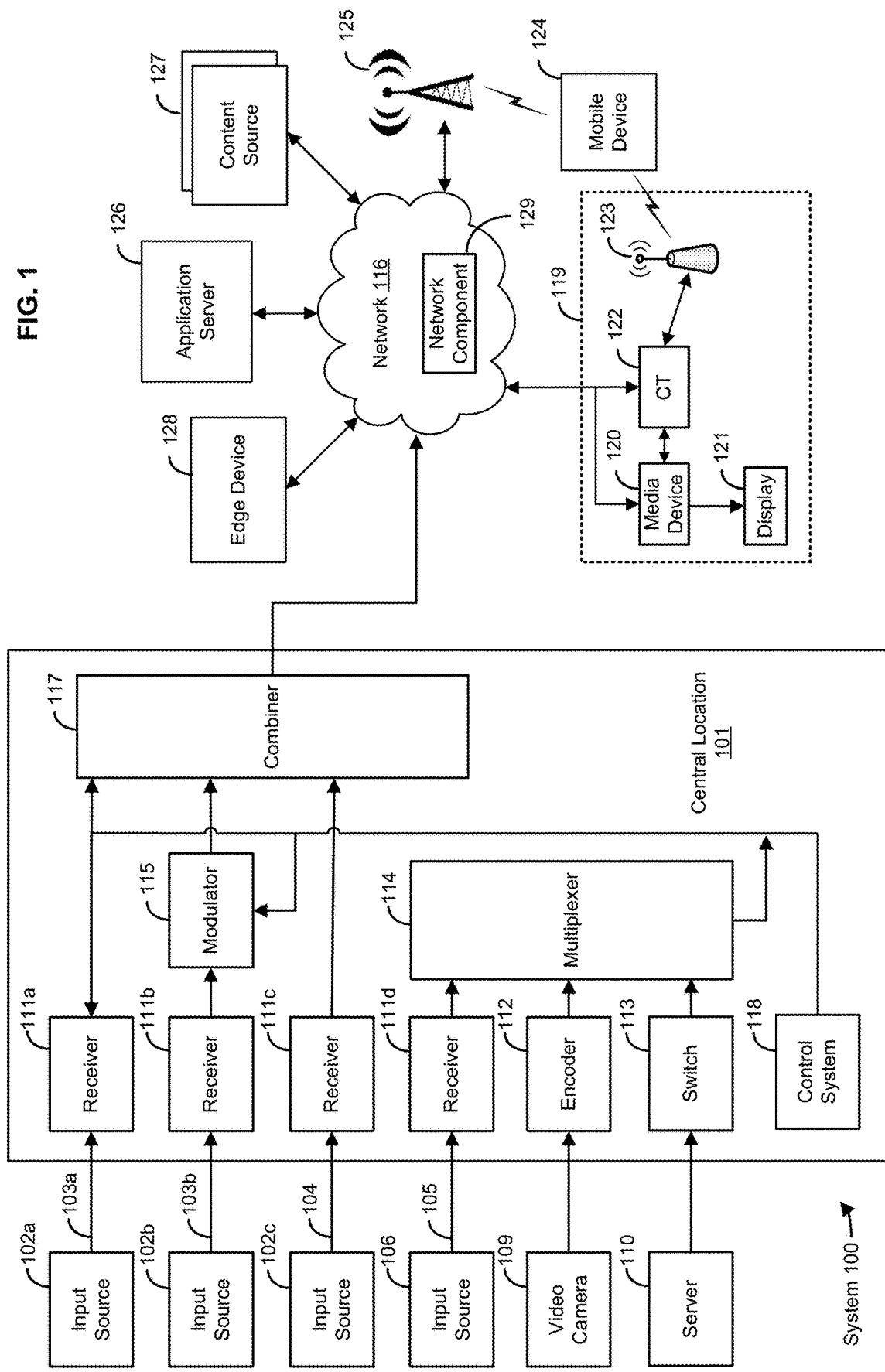
FIG. 1 shows an example system for delivering content.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HEVC, HDR, 4k, 8k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Dolby Digital, Atmos, AAC, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "sending" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio. This detailed description may refer to a given entity performing some action. It should be understood that this language may in some cases mean that a system (e.g., a computer) owned and/or controlled by the given entity is actually performing the action.

The present description relates to methods, systems, and apparatuses for improved content delivery. The quality of content delivered through a content distribution network (CDN) may be affected by an array of network-related constraints. At times when content is being requested by a large number of user devices, some user devices may be forced to frequently adjust the quality level, such as a bitrate, due to processing errors, deployment schemes, and other network-related constraints. Such processing errors, deployment schemes, and other network-related constraints may not be easily discernable (e.g., identified) when quality of content delivered through the CDN is analyzed on a device-by-device basis. During content delivery to user devices of the CDN, a content session may be created for each user device. During each content session, the user devices may send one or more upstream communications. The upstream communications may include an indication that the content session is still active (e.g., a "heartbeat" signal). A user device may send a heartbeat to the CDN at a consistent frequency (e.g., once a minute, every X number of seconds, etc.). The upstream communications may also include one or more requests for content to be delivered at a different bitrate. The user devices may send the one or more requests for the content to be delivered at a different bitrate due to an impairment in the CDN. For example, a user device may be forced to change from a "high" bitrate to a "medium" or a "low" bitrate when a portion(s) of the content encoded at the high bitrate (or the medium bitrate as the case may be) is not delivered to the user device within a sufficient amount of time to maintain an optimal viewing experience (e.g., smooth, consistent playback of content).

In order to provide optimal and consistent content quality, the CDN may aggregate the upstream communications sent by the user devices into session data. For example, the CDN may include a monitoring and analytics ("M&A") module that collects and aggregates the upstream communications sent by the user devices into session data. To assist in determining a specific location affected by CDN impairments, the M&A module may collect and aggregate upstream communications from user devices located in a specific city, county, region, state, etc., based on the granularity of the analysis. The session data may indicate a frequency and/or an amount of instances in which the user devices requested a different bitrate of content during the content session. The session data may indicate a quantity of heartbeat signals sent by the user devices to the CDN while the content session is ongoing. The M&A module may determine based on the session data that an impairment relating to the content session exists. For example, the impairment may be determined to exist based on the session data indicating that a quantity of requests for a different bitrate of content during the content session exceeds a threshold. (e.g., more than 10 times during the content session). At least one source of the impairment may be related to one or more packaging and/or transcoding errors, network congestion associated with the CDN, and/or physical impairments associated with the CDN.

The M&A module may determine that at least one source of the impairment exists for a group of the user devices. The group of user devices may include two or more Data Over Cable Service Interface Specification (DOCSIS) service groups. The two or more DOCSIS service groups may use a same DOCSIS Cable Modem Termination System (CMTS) (e.g., within a same city), or they may use separate DOCSIS CMTSs in close proximity (e.g., within a same region). The group of user devices may be receiving the same content via a same set of quadrature amplitude modulation (QAM) channels.

The M&A module may use the session data to determine an impairment associated with content delivery to the user devices. For example, the M&A module may determine that a quantity of requests for a different bitrate of content during the content session exceeds a threshold, indicating an impairment. The M&A module may be configured to determine at least one source of the impairment that may have caused the user devices to be forced to change the requested bitrate of the content. For example, the user devices may be requesting a same content item, and the M&A module may determine whether the quantity of requests for different bitrates are sent by the user devices within a specified frequency such that the timing of the requests are substantially aligned (e.g., within 25 milliseconds).

The M&A module may determine that substantially aligned bitrate requests for a same content item are indicative of an impairment related to packaging and/or transcoding of the content item by the CDN, such as a packager and/or a transcoder at an origin within the CDN that provides the content item downstream to the user devices. As another example, the user devices may be requesting a same content item, and the M&A module may determine that the bitrate requests are not substantially aligned. The M&A module may determine that substantially un-aligned bitrate requests for the same content item are indicative of an impairment related to network congestion associated with the CDN, and/or physical impairments associated with the CDN and one or more subsets of the user devices. The M&A module may determine a source of such an impairment by determining a region or location shared by a subset(s) of the user devices that are sending the bitrate requests. In this way, the M&A module may narrow down possible causes of the impairment based on the region or location corresponding to the subset(s) of the user devices affected by the impairment.

The one or more errors related to packaging and/or transcoding of the content may be caused by, for example, a loss of a packet identifier associated with a packaged and/or transcoded first portion of the content item, an encoder boundary point misalignment associated with the packaged and/or transcoded first portion of the content item, a loss of an audio packet identifier associated with the packaged and/or transcoded first portion of the content item, a change in metadata associated with the content item (e.g., a manifest change), a combination thereof, and/or any other aspect of packaging and/or transcoding the content item.

As another example, the at least one source of the impairment may be related to a deployment scheme of the CDN (e.g., a delivery protocol). The M&A module may receive first upstream communications sent by a group of devices across two or more service groups during a content session. The M&A Module may aggregate the first upstream communications (e.g., "heartbeat" signals, bitrate requests, etc.) into first session data. The two or more service groups may use a common transport network node, such as a same DOCSIS CMTS (e.g., within a same city), or they may use separate DOCSIS CMTSs in close proximity, such as those within a geographic region (e.g., a state). A first subset of devices in the group may be using a first deployment scheme to receive first content. The first deployment scheme may be a set of QAM channels, a DOCSIS channel, etc. A second subset of devices in the group may be using a second deployment scheme to receive second content. The second deployment scheme may be a set of QAM channels, a DOCSIS channel, etc. The first upstream communications may be a quantity of requests to change a bitrate of content being delivered. The M&A module may determine that the first upstream communications are substantially aligned (e.g., occurring within 25 milliseconds).

The M&A module may receive second upstream communications sent by the first and second subsets of devices (e.g., the entire group of devices across the two or more DOCSIS service groups). The M&A module may aggregate the second upstream communications into second session data. The second upstream communications may be a quantity of requests to change a bitrate of content being delivered. The M&A module may determine that the second upstream communications are substantially aligned (e.g., occurring within 25 milliseconds). The M&A module may determine that the at least one source of the impairment is related to both the first and second deployment schemes of the CDN (e.g., a delivery protocol) and/or issues relating to a transport network based on the first session data and the second session data each indicating the requests for the content to be delivered at a different bitrate are occurring across both the first subset and the second subset of devices (e.g., the impairment is impacting both the first deployment scheme and second deployment scheme). The M&A module may determine that substantially aligned bitrate requests for different content items across the group of devices are indicative of an impairment related to a deployment scheme of the CDN associated with the entire group of devices, such as a DOCSIS channel, a CMTS, a set of QAM channels, etc., that are shared by the first and second subset of devices in the group (e.g., a regional impairment). The two or more DOCSIS service groups may use a same DOCSIS CMTS, thereby indicating to the M&A module that the at least one source of the impairment may be related to node splits and/or amplifiers associated with the CMTS. Accordingly, the M&A module may send a message to another entity of the CDN identifying the at least one source of the impairment. The M&A module may also cause a maintenance procedure to be performed based on determining the at least one source of the impairment.

As another example, the M&A module may determine that the bitrate requests indicated by the first session data and the second session data are not substantially aligned. The M&A module may determine that substantially un-aligned bitrate requests for different content items across the group of devices are indicative of an impairment related to a deployment scheme of the CDN that may not affect the entire group of devices. In such a scenario, the M&A module may determine the impairment is related to the first deployment scheme (e.g., a first set of QAM channels, a first DOCSIS channel) but not the second deployment scheme (e.g., a second set of QAM channels, a second DOCSIS channel)—or vice versa. Accordingly, the M&A module may send a message to another entity of the CDN identifying the at least one source of the impairment. The M&A module may also cause a maintenance procedure to be performed based on determining the at least one source of the impairment.

Turning now to FIG. 1, a system 100 for content delivery is described. Those skilled in the art will appreciate that digital equipment and/or analog equipment may be employed. One skilled in the art will appreciate that provided herein is a functional description and that the respective functions may be performed by software, hardware, or a combination of software and hardware. The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., a user location 119) via a network 116 (e.g., content distribution and/or access system).

The central location 101 may receive content from a variety of input sources 102a, 102b, and 102c. Each of the input sources 102a, 102b, and 102c may be a datacenter having one or more packaging devices, transcoding devices, and content quality devices. The content may be sent from any of the input sources 102a, 102b, or 102c to the central location 101 via a variety of transmission paths, including wireless paths (e.g., satellite paths 103a, 103b) and terrestrial paths 104. The central location 101 may also receive content from an input source 106 via a direct line 105 (e.g., one or more communication links and/or one or more communication paths). Other input sources may be capture devices such as a video camera 109 or a server 110. The content sent by the content sources may comprise a single content item, a portion of a content item (e.g., content fragments), a content stream, a multiplex that includes several content items, and/or the like.

The central location 101 may have one or a plurality of receivers 111a, 111b, 111c, 111d that are associated with one or more corresponding input sources. The central location 101 may comprise one or more encoders 112, switches 113, multiplexers 114, and/or the like. An encoder 112 may compress, encrypt, transform, and/or otherwise encode content. The encoder 112 may encode content based on one or more compression standards, such as MPEG. The encoder may receive content from the video camera 109 and/or other source and apply one or more encoding algorithms to the received content. A switch 113 may provide access to a server 110, which may be a Pay-Per-View server, a data server, an internet router, a network system, a phone system, and the like. Some signals may require additional processing, such as signal multiplexing, prior to being modulated. Such multiplexing may be performed by a multiplexer 114.

The central location 101 may comprise one or more modulators 115 for interfacing with a network 116. A modulator may receive content from a receiver 111, encoder 112, multiplexer 114, and/or the like. A modulator 115 may convert the received content into a modulated output signal suitable for transmission over the network 116. A modulator 115 may map portions of the content to data bits expressed as signals (e.g., sinusoidal signals) at corresponding subcarrier frequencies of a data symbol. The output signals from the modulator 115 may be combined (e.g., packaged), using equipment such as a combiner 117 (e.g., a packaging device), for input into the network 116.

The network 116 may be a content distribution network, a content access network, and/or the like. The network 116 may be configured to send content from a variety of sources using a variety of network paths, protocols, devices, and/or the like. The content distribution network and/or content access network may be managed (e.g., deployed, serviced) by a content provider, a service provider, and/or the like. The network 116 may have a plurality of communication links connecting a plurality of devices. Content, or segments thereof, may be delivered by the network 116 using adaptive bitrate streaming. Content, or segments thereof, may be in HLS, DASH, or any other suitable streaming format. Content, or segments thereof, may be delivered by the network 116 to user devices along with classification metadata indicative of a quality classification for the content, or segments thereof, such as low quality, medium quality, or high quality. The quality classification for a given content item or content segment may be determined based on existing adaptive bitrate streaming approaches known in the art, or it may simply be based on a bitrate associated the content item or content segment.

A control system 118 may permit a system operator to control and monitor the functions and performance of system 100. The control system 118 may interface, monitor, and/or control a variety of functions, including, but not limited to, the channel lineup for a television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116. At the user location 119, a media device 120 may demodulate and/or decode, if needed, the signals for display on a display device 121, such as on a television set (TV) or a computer monitor. The media device 120 may be a demodulator, decoder, frequency tuner, and/or the like. The media device 120 may be directly connected to the network 116 (e.g., for communications via in-band and/or out-of-band signals of a content delivery network) and/or connected to the network 116 via a communication terminal 122 ("CT") (e.g., for communications via a packet switched network). The media device 120 may be a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. The communication terminal 122 may be configured to send upstream communications generated by one or more of the media device 120, a mobile device 124 (e.g., a user device), the display device 121, or other computing devices (e.g., laptops, sensor devices, security devices) to the network 116 during a content session. The media device 120, the mobile device 124, the display device 121, and/or the other computing devices may send the upstream communications to the network 116 via the communication terminal 122 as part of normal, routine operation. The communication terminal 122, for a cable network, may be configured to provide network access via a variety of communication protocols and standards, such as Data Over Cable Service Interface Specification (DOCSIS). For example, the communication terminal 122 may be part of a DOCSIS service group that includes the user location 119 and other user locations (not shown).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as the mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not necessarily be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park, etc.).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to send data, handle requests, and/or otherwise facilitate operation of applications for the user.

The system 100 may have one or more content sources 127. The content source 127 may be configured to send content (e.g., video, audio, games, applications, data) to the user. The content source 127 may be configured to send streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to send the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The system 100 may have an edge device 128. The edge device 128 may be configured to provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to receive packaged content (e.g., from the central location 101 and/or any of the input sources 102a, 102b, or 102c) for delivery to the user, convert content for delivery to the user (e.g., in a specific format requested by a user device), send the user a manifest file (e.g., or other index file describing portions of the content), send streaming content (e.g., unicast, multicast), provide a file transfer, and/or the like. The edge device 128 may cache or otherwise store content (e.g., frequently requested content) to enable faster delivery of content to users.

The edge device 128 may receive a request for content from the user location 119. The edge device 128 may receive a request for content from a client device (e.g., the media device 120, the mobile device 124, the communication terminal 122, etc.). The edge device 128 may establish a communication link with the client device. The edge device 128 may determine whether the edge device 128 has access to the requested content. The edge device 128 may determine whether the edge device 128 has access to the requested content after receiving the request for content from the client device. The edge device 128 may determine whether a cache associated with the edge device 128 has the requested content (e.g., a mid-tier cache, such as the central location 101). If the edge device 128 does not have access to the requested content, the edge device 128 may request the requested content from the central location 101, a different edge device 128 and/or the content source 127.

The edge device 128 may establish a communication link with the central location 101, a different edge device 128 and/or the content source 127 to receive the requested content. The edge device 128 may track the content received from the central location 101, a different edge device 128 and/or the content source 127. The control system 118 may determine that the central location 101 does not have access to the requested content. The control system 118 may establish a communication link with input source 102a (e.g., based on the request for the content). The input source 102a may send a redirect message to the control system 118 indicating that the requested content is available from input source 102b. The central location may receive the requested content from input source 102b and provide the requested content to the edge device 128 for delivery to the user.

The system 100 may have a network component 129. The network component 129 may be any device, module, and/or the like communicatively coupled to the network 116. The network component 129 may be a gateway, a storage device (e.g., a cache), a server, a network access location (e.g., tap), physical link, and/or the like. As shown in FIG. 1, the network component 129 may be a part of the network 116; however, in some examples, the network component 129 may be resident at any upstream device of the system 100, such as the edge device 128, the application server 126, the central location 101, or the content source 127. The network component 129 may receive, via the communication terminal 122, upstream communications generated by one or more of the media device 120, the mobile device 124, and/or the display device 121 (collectively, "the computing devices") related to a content session. For example, the upstream communications may include one or more heartbeat signals sent by one or more of the computing devices to indicate a content session is ongoing. One or more of the computing devices may send a heartbeat signal to the network component 129 at a consistent frequency (e.g., one a minute, every X number of seconds, etc.). The upstream communications may also include one or more requests for content to be delivered at a different bitrate during the content session.

In order to provide optimal and consistent content quality, the network component 129 may collect and aggregate the upstream communications sent by the computing devices into session data. The session data may indicate a frequency and/or an amount of instances in which the user devices requested a different bitrate of content during the content session. The session data may indicate a quantity of heartbeat signals sent by the user devices to the CDN while the content session is ongoing. The network component 129 may use the session data to determine that an impairment related to the content session exists within the system 100. For example, the impairment may be determined to exist based on the session data indicating that a quantity of requests for a different bitrate of content during the content session exceeds a threshold (e.g., more than 10 times during the content session). As another example, the impairment may be determined to exist based on the session data indicating that a quantity of bitrate changes during a portion of the content session (e.g., a 15 minute window) exceeds a threshold (e.g., more than 10 times during the portion of content session). The network component 129 may determine that at least one source of the impairment is related to packaging and/or transcoding of the content based on the session data indicating a quantity of requests for a different bitrate of content during the content session were sent by the computing devices within a threshold range of time (e.g., within 25 milliseconds). As another example, the network component 129 may determine that the at least one source of the impairment is related to the packaging and/or transcoding of the content based on the session data indicating that a quantity of requests for a different bitrate of content during the content session was sent by the computing devices a threshold quantity of instances (e.g., 10 times in the same content session).

As discussed herein, the network component 129 may determine that a quantity of requests for a different bitrate of content during the content session exceeds a threshold, indicating an impairment. The network component 129 may be configured to determine at least one source of the impairment that may have caused the computing devices to be forced to change the requested bitrate of the content. For example, the computing devices may be requesting a same content item, and the network component 129 may determine whether the quantity of requests for different bitrates are sent by the computing devices within a specified frequency such that the timing of the requests are substantially aligned. The network component 129 may determine that substantially aligned bitrate requests for a same content item are indicative of an impairment related to packaging and/or transcoding of the content item by the system 100. As another example, the computing devices may be requesting a same content item, and the network component 129 may determine that the bitrate requests are not substantially aligned. The network component 129 may determine that substantially un-aligned bitrate requests for the same content item are indicative of an impairment related to network congestion associated with the system 100, and/or physical impairments associated with the system 100.

As a further example, the network component 129 may determine that the at least one source of the impairment is related to a deployment scheme of the CDN (e.g., a DOCSIS service group, a set of QAM channels, etc.). For example, the computing devices may be associated with two or more service groups of the system 100. The computing devices of each service group may be requesting different content items, and the network component 129 may determine whether the quantity of requests across the two or more service groups are substantially aligned. The network component 129 may determine that substantially aligned bitrate requests for different content items across two or more service groups are indicative of an impairment related to a deployment scheme of the system 100 associated with both of the service groups (e.g., a regional impairment). As a further example, the computing devices of each service group may be requesting different content items, and the network component 129 may determine that the bitrate requests are not substantially aligned. The network component 129 may determine that substantially un-aligned bitrate requests for different content items across two or more service groups are indicative of an impairment related to a deployment scheme of the system 100 that may not affect all of the service groups (e.g., a sub-regional impairment) .Accordingly, the network component 129 may send a message to another entity of the system 100 identifying the at least one source of the impairment. The network component 129 may also cause a maintenance procedure to be performed based on determining the at least one source of the impairment.

Figure 2:
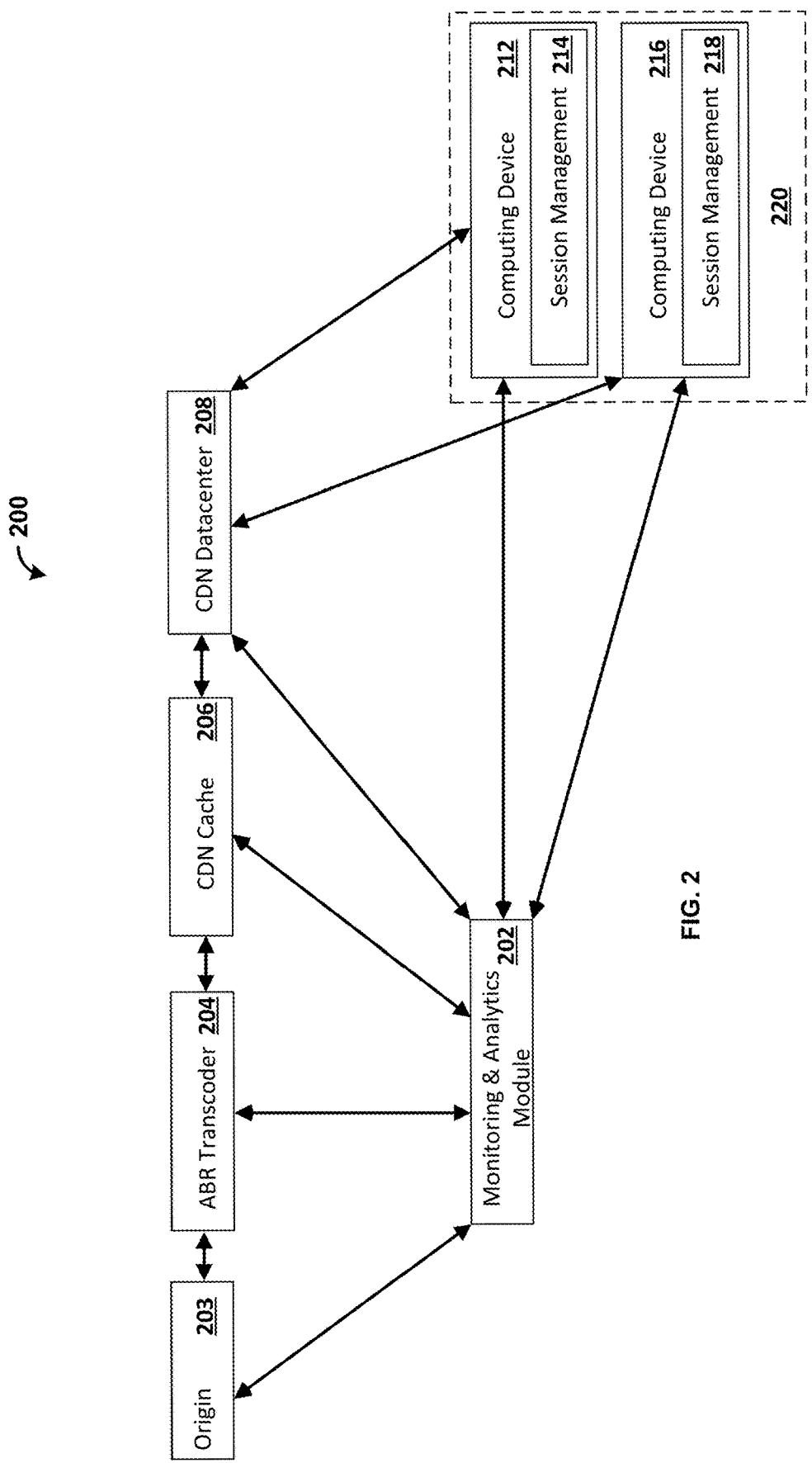
FIG. 2 shows an example system for analyzing content delivery.

Turning now to FIG. 2, a system 200 for content delivery in accordance with the present description is shown. As further described herein, components of the system 200 may correspond to components of the system 100 of FIG. 1. The system 200 may receive a content segment(s) at an Adaptive Bitrate ("ABR") Transcoder 204 from an origin 203. The origin 203 may be a content source, such as any one of the input sources 102a, 102b, 102c, the application server 126, or the content source 127 of FIG. 1. The content segment(s) may be sent to the ABR Transcoder 204 via a variety of transmission paths, including a wireless path (e.g., satellite paths 103a, 103b) and/or a terrestrial path (e.g., terrestrial path 104). The ABR Transcoder 204 may transcode the content segment(s) received from the content source. The ABR Transcoder 204 may assign a bitrate (e.g., low, medium, high, etc.) to the transcoded content segment(s). For example, the ABR Transcoder 204 may assign the bitrate based on an amount of compression applied to the transcoded content segment(s). As another example, the ABR Transcoder 204 may assign the bitrate based on a video resolution, e.g. 1080, 480 or 240, associated with the transcoded content segment(s). The system 200 may include a Content Distribution Network ("CDN") cache 206. As an example, the CDN cache 206 may be a mid-tier cache, such as the central location 101. The CDN cache 206 may receive the content segment(s) from the ABR Transcoder 204 (e.g., after being transcoded) and store the content segment(s) in a memory of the CDN cache 206. The CDN cache 206 may send the content segment(s) to a CDN Datacenter 208, which may be another cache device of the system 200, such as an edge cache device (e.g., edge cache 128). The CDN Datacenter 208 may send the content segment(s) to a computing device 212 and/or a computing device 216. Each of the computing device 212 and the computing device 216 may be a user device, such as the media device 120 or the mobile device 124 of FIG. 1, or any other computing device configured to receive and/or present content. Each of the computing device 212 and the computing device 216 may send requests for content to the CDN Datacenter 208. The requests for content may include a requested bitrate(s). As an example, the computing device 212 may send a request for content including a first bitrate, and the computing device 216 may send a request for content including a second bitrate that differs from the first bitrate. As another example, each request sent by each of the computing device 212 and the computing device 216 may be a same bitrate.

The CDN Datacenter 208 may send a received request for content to the CDN cache 206. The CDN cache 206 may provide the requested content at the corresponding requested bitrate to the CDN Datacenter 208 if the requested content at the requested bitrate is located at (e.g., stored in memory of) the CDN cache 206. When the requested content at the requested bitrate is not located at the CDN cache 206, the CDN cache 206 may send the request to the ABR transcoder 204. The ABR transcoder 204 may request the content from the origin 203 and transcode the content at the requested bitrate. The ABR transcoder 204 may send the transcoded content to the CDN Datacenter 208 via the CDN cache 206. While not shown for ease of explanation, one skilled in the art can appreciate that the system 200 may have any number of origins 203, ABR transcoders 204, CDN caches 206, CDN Datacenters 208, and/or computing devices 212 and 216.

The computing device 212 may include a session management module 214. The session management module 214 may manage all established communication links associated with the computing device 212. For example, the session management module 214 may manage the communication links between the computing device 212 and the CDN Datacenter 208. After the computing device 212 establishes a communication link with the CDN Datacenter 208, the computing device 212 may indicate to the session management module 214 that a communication link has been established so that the session management module 214 may manage the newly established communication link. The session management module 214 may then ensure that the computing device 212 receives the content requested from the CDN Datacenter 208. In this manner, the session management module 214 may ensure that the computing device 212 has the most up to date content from the CDN Datacenter 208. That is, once the communication link is established between the CDN Datacenter 208 and the computing device 212, the session management module 214 may ensure the requested content is received from the CDN Datacenter 208 until the communication link is closed between the CDN Datacenter 208 and the computing device 212. For example, the communication link may be closed by the CDN Datacenter 208. As another example, the communication link may be closed by the computing device 212 (e.g., upon termination of a rendering of the content by the computing device 212).

The session management module 214 may monitor the communication link to ensure the communication link is still active during a content session (e.g., viewing/consuming content by a user). The system 200 may include a Monitoring and Analytics ("M&A") Module 202, which may correspond to the network component 129. The M&A Module 202 may collect and aggregate upstream communications sent by the computing device 212 during the content session. The upstream communications may be sent to the M&A Module 202 via the session management module 214. For example, as further described herein, the session management module 214 may send an upstream communication, such as a heartbeat signal, to the M&A Module 202 to indicate that the content session is ongoing. Upstream communications may be sent by the session management module 214 at a regular interval (e.g., every minute) during the content session. The communication link may be closed and/or deactivated by the computing device 212 when the computing device 212 no longer needs the content associated with the communication link. As an example, a user of the computing device 212 may indicate to the computing device 212 that the user no longer wishes to consume the content. Thus, the computing device 212 may close and/or deactivate the communication link between the computing device 212 and the CDN Datacenter 208.

The computing device 216 may include a session management module 218. The session management module 218 may manage all established communication links associated with the computing device 216. For example, the session management module 218 may manage the communication links between the computing device 216 and the CDN Datacenter 208. After the computing device 216 establishes a communication link with the CDN Datacenter 208, the computing device 216 may indicate to the session management module 218 that a communication link has been established so that the session management module 218 may manage the newly established communication link. The session management module 218 may then ensure that the computing device 216 receives the content requested from the CDN Datacenter 208. In this manner, the session management module 218 may ensure that the computing device 216 has the most up to date content from the CDN Datacenter 208. That is, once the communication link is established between the CDN Datacenter 208 and the computing device 216, the session management module 218 may ensure the requested content is received from the CDN Datacenter 208 until the communication link is closed between the CDN Datacenter 208 and the computing device 216. For example, the communication link may be closed by the CDN Datacenter 208. As another example, the communication link may be closed by the computing device 216 (e.g., upon termination of a rendering of the content by the computing device 216).

The session management module 218 may monitor the communication link to ensure the communication link is still active during a content session (e.g., viewing/consuming content by a user). The M&A Module 202 may collect and aggregate upstream communications sent by the computing device 216 during the content session. The upstream communications may be sent to the M&A Module 202 via the session management module 218. For example, as further described herein, the session management module 218 may send an upstream communication, such as a heartbeat signal, to the M&A Module 202 to indicate that the content session is ongoing. Upstream communications may be sent by the session management module 218 at a regular interval (e.g., every minute) during the content session. The communication link may be closed and/or deactivated by the computing device 216 when the computing device 216 no longer needs the content associated with the communication link. As an example, a user of the computing device 216 may indicate to the computing device 216 that the user no longer wishes to consume the content. Thus, the computing device 216 may close and/or deactivate the communication link between the computing device 216 and the CDN Datacenter 208.

The M&A Module 202 may be an upstream device/component of the CDN, such as a cache device, a server, or a network component (e.g., the network component 129). The M&A Module 202 may be resident within the CDN cache 206 or the CDN Datacenter 208. As another example, and as shown in FIG. 2, the M&A Module 202 may be a separate entity that may be in communication with one or more of the ABR Transcoder 204, the CDN cache 206, the CDN datacenter 208, and/or one or both of the computing device 212 and 216. As discussed herein, each of the session management modules 214 or 218 may send upstream communications related to a corresponding content session to the M&A Module 202. The M&A Module 202 may collect and aggregate the upstream communications into session data. The session data may indicate a frequency and/or an amount of instances in which the computing device 212 and/or 216 requested a different bitrate of content during the content session. In addition to, or alternatively, the CDN Datacenter 208 may notify the M&A Module 202 each instance the CDN Datacenter 208 receives a request from the computing device 212 and/or 216 to request a different bitrate of content. In notifying the M&A Module 202, the CDN Datacenter 208 may include an identifier associated with the computing device 212 and/or 216. As an example, the identifier may be an internet protocol ("IP") address, a Media Access Control address, a device serial number, a combination thereof, and/or the like.

As described herein, the session data may indicate a frequency and/or an amount of instances in which the computing device 212 and/or 216 changed a requested bitrate of content during the content session. As an example, the computing device 212 and/or 216 may be forced to change from a "high" bitrate to a "medium" or a "low" bitrate when a portion(s) of the content encoded at the high bitrate is not received within a sufficient amount of time to maintain an optimal viewing experience (e.g., smooth, consistent playback of content). The M&A Module 202 may use the session data to determine that an impairment related to the content session exists. The M&A Module 202 may determine that the impairment may have caused the computing device 212 and/or 216 to be forced to change the requested bitrate for the content. The impairment may be determined to exist based on the session data indicating that a quantity of requests sent by the computing device 212 and/or 216 for a different bitrate of content during the content session exceeds a threshold (e.g., more than 10 times during the content session).

At least one source of the impairment may be related to one or more packaging and/or transcoding errors at the ABR Transcoder 204. For example, the M&A Module 202 may determine, based on the session data, that the at least one source of the impairment for each of the computing device 212 and 216 is related to the packaging and/or transcoding of the content. The computing device 212 may be on a first Data Over Cable Service Interface Specification (DOCSIS) service group, while the computing device 216 may be on a second DOCSIS service group. The two DOCSIS service groups may use a same DOCSIS Cable Modem Termination System (CMTS) (e.g., within a same city), or they may use separate DOCSIS CMTSs in close proximity (e.g., within a same region). The computing device 212 and 216 may be receiving the same content via a same set of quadrature amplitude modulation (QAM) channels. The M&A Module 202 may determine that the at least one source of the impairment for the computing devices 212 and 216 is related to the packaging and/or transcoding of the content based on the session data indicating the computing devices 212 and 216 both requested a different bitrate of content within a threshold range of time (e.g., within 25 milliseconds) and/or a threshold quantity of instances (e.g., 10 times in the same content session). The M&A module may be configured to determine at least one source of the impairment that may have caused the computing devices 212 and 216 to be forced to change the requested bitrate of the content. For example, the computing devices 212 and 216 may be requesting a same content item, and the M&A Module 202 may determine whether the quantity of requests for different bitrates are sent by the computing devices 212 and 216 within a specified frequency such that the timing of the requests are substantially aligned (e.g., within 25 milliseconds).

The M&A Module 202 may determine that substantially aligned bitrate requests for a same content item are indicative of an impairment related to packaging and/or transcoding of the content item by the system 200, such the origin 203 packager and/or the ABR Transcoder 204 that provides the content item downstream to the computing devices 212 and 216. As another example, the computing devices 212 and 216 may be requesting a same content item, and the M&A Module 202 may determine that the bitrate requests are not substantially aligned. The M&A Module 202 may determine that substantially un-aligned bitrate requests for the same content item are indicative of an impairment related to network congestion associated with the system 200, and/or physical impairments associated with the system 200 and one or more subsets of computing devices. The M&A Module 202 may determine a source of such an impairment by determining a region or location shared by the computing devices 212 and 216. In this way, the M&A Module 202 may narrow down possible causes of the impairment based on the region or location corresponding to the computing devices 212 and 216 that are affected by the impairment. The one or more errors related to packaging and/or transcoding of the content may be caused by, for example, a loss of a packet identifier associated with a packaged and/or transcoded first portion of the content item at the ABR Transcoder 204, an encoder boundary point misalignment associated with the packaged and/or transcoded first portion of the content item at the ABR Transcoder 204, a loss of an audio packet identifier associated with the packaged and/or transcoded first portion of the content item at the ABR Transcoder 204, a change in metadata associated with the content item (e.g., a manifest change) received from the origin 202 at the ABR Transcoder 204, a combination thereof, and/or any other aspect of packaging and/or transcoding the content item.

As shown in FIG. 2, the computing device 212 and 216 may be part of a device group 220. The device group 220 may correspond to a DOCSIS CMTS. The device group 220 may receive requested content from the CDN Datacenter 208 via the same or separate DOCSIS service groups. The computing device 212 may be using a first deployment scheme to receive first content from the CDN Datacenter 208. The first deployment scheme may be a set of QAM channels, a DOCSIS channel, etc. The computing device 216 may be may be using a second deployment scheme to receive second content from the CDN Datacenter 208. The second deployment scheme may be a set of QAM channels, a DOCSIS channel, etc.

The M&A Module 202 may receive first upstream communications related to a corresponding content session from each of the computing devices 212 and 216. The first upstream communications may be a quantity of requests to change a bitrate of content being delivered. The M&A Module 202 may determine that the first upstream communications are substantially aligned (e.g., occurring within 25 milliseconds). The M&A Module 202 may receive further upstream communications related to the corresponding content session from each of the computing devices 212 and 216. The M&A Module 202 may aggregate the further upstream communications into further session data. The further session data may indicate that the computing devices 212 and 216 each requested a different bitrate of content within a threshold range of time (e.g., within 25 milliseconds) and/or a threshold quantity of instances (e.g., 10 times in the same content session). For example, the threshold may be 5 instances of changing the bitrate, and the further session data may indicate the computing device 212 requested a different bitrate of content at least 10 times, while the computing device 216 requested a different bitrate of content at least 5 times.

The M&A Module 202 may determine that the further upstream communications are substantially aligned (e.g., occurring within 25 milliseconds). The M&A Module 202 may determine that the at least one source of the impairment is related to both the first and second deployment schemes of the system 200 (e.g., a delivery protocol) and/or issues relating to a transport network based on the first session data and the further session data each indicating the requests for the content to be delivered at a different bitrate are occurring for both the computing device 212 and the computing device 216 (e.g., the impairment is impacting both the first deployment scheme and second deployment scheme). The M&A Module 202 may determine that substantially aligned bitrate requests for different content items received from both the computing device 212 and the computing device 216 are indicative of an impairment related to a deployment scheme of the system 200 associated with the entire service group 220, such as a DOCSIS channel, a CMTS, a set of QAM channels, etc., that are shared by the computing device 212 and the computing device 216 in the service group 220 (e.g., a regional impairment). The two or more DOCSIS service groups may use a same DOCSIS CMTS, thereby indicating to the M&A Module 202 that the at least one source of the impairment may be related to node splits and/or amplifiers associated with the CMTS. Accordingly, the M&A Module 202 may send a message to another entity of the system 200 identifying the at least one source of the impairment. The M&A Module 202 may also cause a maintenance procedure to be performed based on determining the at least one source of the impairment.

As another example, the M&A module may determine that the bitrate requests indicated by the first session data and the further session data are not substantially aligned. The further session data may indicate that the computing devices 212 and 216 each requested a different bitrate of content at different times (e.g., not substantially aligned). For example, the further session data may indicate the computing device 212 requested a different bitrate of content at times T0, T3, T10, T16, and T18, while the computing device 216 requested a different bitrate of content at times T1, T4, and T12.

Using the further session data, the M&A Module 202 may determine that substantially un-aligned bitrate requests for different content items across the service group 220 are indicative of an impairment related to a deployment scheme that may not affect the entire service group 220. In such a scenario, the M&A Module 202 may determine the impairment is related to the first deployment scheme (e.g., a first set of QAM channels, a first DOCSIS channel) but not the second deployment scheme (e.g., a second set of QAM channels, a second DOCSIS channel)—or vice versa. The computing devices 212 and 216 may not use a same DOCSIS CMTS, thereby indicating to the M&A Module 202 that the at least one source of the impairment may be related to node splits and/or amplifiers associated with the particular CMTS. For example, the M&A Module 202 may determine that the at least one source of the impairment is related to either the first subset of QAM channels or the second subset of QAM channels based on the further session data indicating that the requests for a differing bitrate were sent by each of the computing devices 212 and 216 at different times and/or a different amount of instances (e.g., not aligned). Accordingly, the M&A Module 202 may send a message to another entity of the system 200, such as the origin 203, the ABR transcoder 204, the CDN cache 206 and/or the CDN Datacenter 208, indicating that the at least one source of the impairment is related to the DOCSIS service group.

As another example, the device group 220 may be part of a fiber-based network. In such an example, the computing devices 212 and 216 may not use a same optical line terminator ("OLT"), thereby indicating to the M&A Module 202 that the at least one source of the impairment may be related to one or more optical network units ("ONU") (e.g., an ONU serving either the computing device 212 or the computing device 216).

The M&A Module 202 may also cause a maintenance procedure to be performed by another entity of the system 200 based on determining the at least one source of the impairment. As an example, the maintenance procedure may include triggering one or more alarms at a control station of the CDN Datacenter 208 and/or causing additional monitoring to commence by the CDN Datacenter 208. As another example, the maintenance procedure may include assigning additional resources (e.g., service teams) to a location (e.g., the CMTS) for equipment correction and/or replacement and/or notifying a provider of the requested content of an issue existing outside the CDN. As a further example, the maintenance procedure may include causing one or both of the computing devices 212 and 216 to use an alternate DOCSIS service group, and/or causing one or both of the computing devices 212 and 216 to use another mode of network transport other than DOCSIS to receive further content, such as wireless/cellular services. Additionally, the maintenance procedure may include scaling certain systems within the CDN and/or restarting them. As another example, the maintenance procedure may include restricting or limiting new service flows—or even service types—to one or both of the computing devices 212 and 216 (e.g., "best effort" internet traffic permitted versus restriction/limitation of certain video traffic). In this way, available bandwidth for the DOCSIS service group may be increased, or at least not further decreased, while maintaining service in the DOCSIS service group.

Turning now to FIG. 3, example session data 300 is shown. As discussed herein, the media device 120, the mobile device 124, the computing device 212, and/or the computing device 216 (collectively, a "computing device") may send upstream communications related to a corresponding content session to a Content Distribution Network ("CDN") monitoring device. The CDN monitoring device may collect and aggregate the upstream communications and generate the session data 300. The session data 300 may be based on upstream communications sent by the computing device—or by a plurality of computing devices—to the CDN monitoring device for a content session. For purposes of explanation, the session data 300 may be for a single computing device and a single content session lasting 15 minutes and 21 seconds. The session data 300 may indicate a session identifier 302, a session duration 303, a content type 304, a device model 306, a heartbeat identifier 308, and a counter 310 relating to a number of times the computing device requested a different bitrate of content during the content session. As indicated by the heartbeat identifier 308, the computing device may have sent 10 heartbeats total during the content session. As indicated by the counter 310, the computing device may have requested a different bitrate of content a total of 108 times during the content session (e.g., every 8.5 seconds approximately). The session data 300 may also indicate a plurality of bitrates 312 each corresponding to a bitrate at which the computing device was receiving the requested content when each of the 10 heartbeat messages were sent. The session data 300 may further include a plurality of timestamps 314 each corresponding to a timestamp of the requested content at which each of the 10 heartbeats (e.g., upstream communications) were sent.

The CDN monitoring device may determine based on the session data 300 that an impairment relating to the content session exists. The impairment may be determined to exist based on a quantity of bitrate changes during the content session exceeding a threshold (e.g., more than 10 times during the content session). The CDN monitoring device may determine based on the session data 300 that at least one source of the impairment is related to the packaging and/or transcoding of the requested content. As an example, the CDN monitoring device may make this determination based on the session data 300 indicating the computing device requested a different bitrate of content each time within a threshold range of time and/or a threshold quantity of instances as did another computing device in a same service group (e.g., 10 times or more within 25 milliseconds of each other). The computing devices may be requesting a same content item, and the CDN monitoring device may determine whether the quantity of requests for different bitrates are sent by the computing devices within a specified frequency such that the timing of the requests are substantially aligned. The CDN monitoring device may determine that substantially aligned bitrate requests for a same content item are indicative of an impairment related to packaging and/or transcoding of the content item by the CDN. As another example, the computing devices may be requesting a same content item, and the CDN monitoring device may determine that the bitrate requests are not substantially aligned. The CDN monitoring device may determine that substantially un-aligned bitrate requests for the same content item are indicative of an impairment related to network congestion associated with the CDN, and/or physical impairments associated with the CDN.

The CDN monitoring device may determine based on the session data 300 that the at least one source of the impairment is related to a deployment scheme of the CDN (e.g., a delivery protocol, such as one or more QAM channels of a DOCSIS service group). For example, the computing devices may be associated with two or more service groups. The computing devices of each service group may be requesting different content items, and the CDN monitoring device may determine whether the quantity of requests across the two or more service groups are substantially aligned. The CDN monitoring device may determine that substantially aligned bitrate requests for different content items across two or more service groups are indicative of an impairment related to a deployment scheme of the CDN associated with both of the service groups (e.g., a regional impairment). As a further example, the computing devices of each service group may be requesting different content items, and the CDN monitoring device may determine that the bitrate requests are not substantially aligned. For example, the CDN monitoring device may make this determination based on the session data 300 indicating the computing device did not change the requested bitrate each time within the threshold range of time and/or the threshold number of instances as did the other computing device. The CDN monitoring device may determine that substantially un-aligned bitrate requests for different content items across two or more service groups are indicative of an impairment related to a deployment scheme of the CDN that may not affect all of the service groups (e.g., a sub-regional impairment).

As another example, the CDN monitoring device may determine based on the session data 300 that the at least one source of the impairment is related to a network split (e.g. node) or a subscriber premise associated with the computing device when the session data 300 is compared to historical records associated with the computing device and/or subscriber premises (e.g., a long history of frequent changes in bitrates during content sessions). Accordingly, the CDN monitoring device may send a message to another entity of the CDN, such as an origin, a transcoder, a cache and/or a datacenter, indicating that the at least one source of the impairment is related to the DOCSIS service group. The CDN monitoring device may also cause a maintenance procedure to be performed by another entity of the CDN based on determining the at least one source of the impairment.

Figure 4:
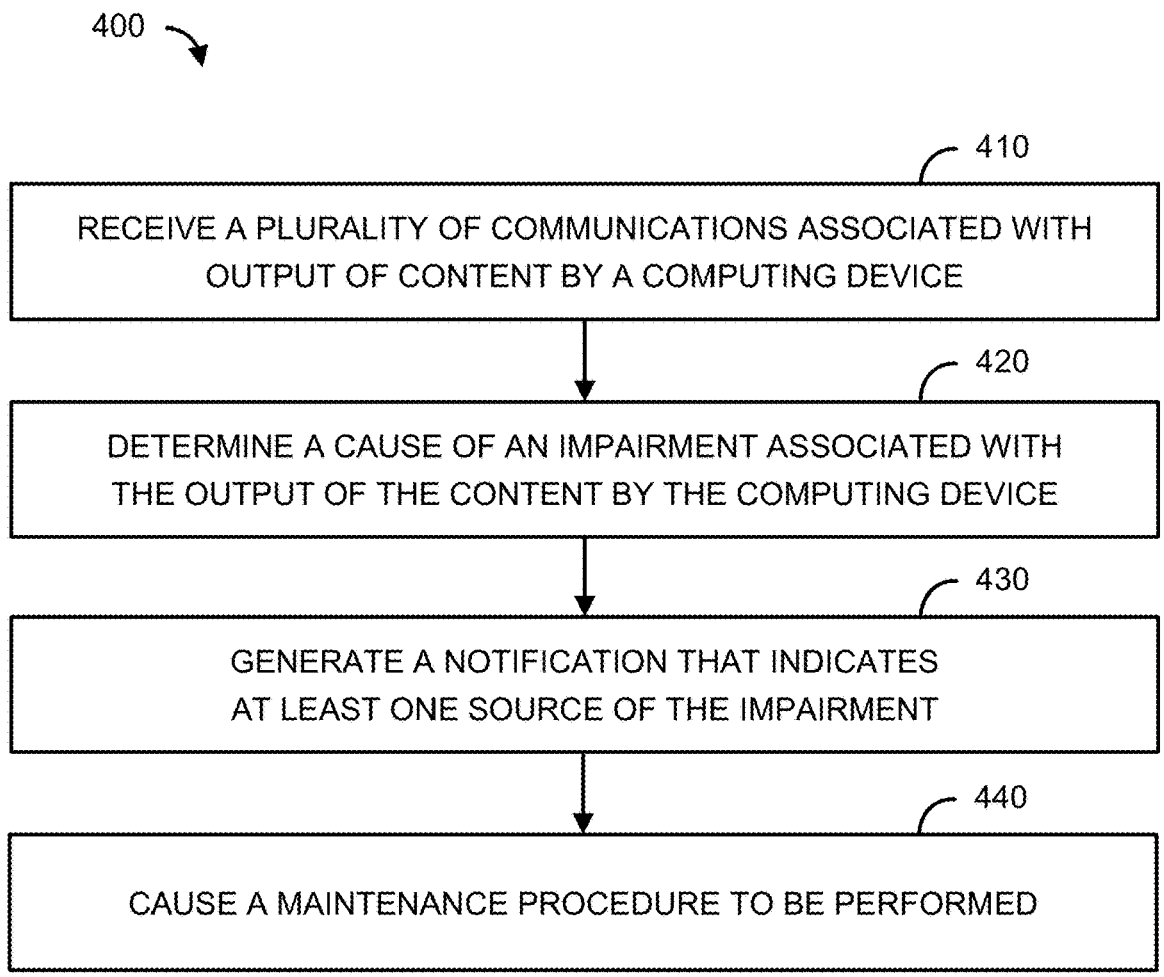
FIG. 4 shows a flowchart of an example method for content delivery.

Turning now to FIG. 4, a flowchart of an example method 400 for improved content delivery in accordance with the present description in shown. The method 400 may be implemented using the system 100 of FIG. 1 or the system 200 of FIG. 2. For example, the method 400 may be performed by the network component 129 or the M&A Module 202.

At step 410, a plurality of communications may be received from a computing device in communication with a content distribution network ("CDN"), such as the computing device 212, the computing device 216, the media device 120, the mobile device 124, or any other computing device configured to receive and/or present content. The plurality of communications may be upstream communications as described herein. The plurality of communications may be generated by the computing device during output of content by the computing device during a content session. The plurality of communications may be aggregated into session data. For example, the plurality of communications may include a heartbeat sent by the computing device during the content session. The plurality of communication may indicate a change in a bitrate associated with output of the content by the computing device during the content session. For example, the computing device may request the content at a plurality of bitrates over a period of time during the content session, and the session data may indicate a number of instances and/or a frequency with which the computing device changed from one of the plurality of bitrates to another.

At step 420, a cause of an impairment associated with the output of the content by the computing device may be determined. The impairment may be determined based on the session data. The session data may indicate that a threshold is satisfied. For example, the impairment may be determined to exist based on the session data indicating that a quantity of bitrate changes (e.g., based on the plurality of communications) made by the computing device during the content session exceeds the threshold (e.g., more than 10 times during the content session).

At least one source of the impairment may be related to one or more packaging and/or transcoding errors associated with the content requested by the computing device. For example, a second plurality of communications may be received from a plurality of other computing devices that each requested the content. The second plurality of communications may be upstream communications. The second plurality of communications may be generated by the plurality of other computing devices during corresponding content sessions associated with output of the content. The second plurality of communications may be aggregated into second session data. The at least one source of the impairment associated with the output of the content by the computing device and the plurality of other computing devices may be determined to be related to the packaging and/or transcoding of the content based on the first session data and the second session data indicating that the computing devices all changed a requested bitrate within a threshold range of time (e.g., within 25 milliseconds) a threshold quantity of instances (e.g., 10 times in the same content session).

For example, the computing device and the plurality of other computing devices may be requesting a same content item, and it may be determined whether the quantity of bitrate change requests are sent by each of the devices within a specified frequency such that the timing of the requests are substantially aligned (e.g., within 25 milliseconds). Substantially aligned bitrate requests for a same content item may be indicative of an impairment related to packaging and/or transcoding errors. As another example, the computing device and the plurality of other computing devices may be requesting a same content item, and it may be determined that the bitrate requests are not substantially aligned. Substantially un-aligned bitrate requests for the same content item may be indicative of an impairment related to network congestion and/or physical network impairments.

As another example, the at least one source of the impairment may be related to a deployment scheme of the CDN (e.g., a delivery protocol), such as a Data Over Cable Service Interface Specification (DOCSIS) service group(s). For example, the computing device may be part of a first DOCSIS service group, and the plurality of computing devices may be part of a second DOCSIS service group. The DOCSIS service groups may use a same DOCSIS Cable Modem Termination System (CMTS) (e.g., within a same city), or they may use separate DOCSIS CMTSs in close proximity, such as those within a geographic region (e.g., a state). The DOCSIS service group may consist of one or more quadrature amplitude modulation (QAM) channels. The computing device may be using a first deployment scheme to receive first content, while the plurality of other computing devices may be using a second deployment scheme to receive second content. Further upstream communications may be received from each of the computing device and the plurality of other computing devices. The further upstream communications may be aggregated into further session data. The further session data may indicate that each of the computing device and the plurality of other computing devices requested a different bitrate of content within a threshold range of time (e.g., within 25 milliseconds) and/or a threshold number of instances (e.g., 10 times in the same content session).

The at least one source of the impairment may be determined to be related to the deployment scheme of the CDN (e.g., a delivery protocol) and/or issues relating to a transport network based on the first session data and the further session data each indicating the requests for a differing bitrate are occurring for all of the computing devices and are substantially aligned. For example, the at least one computing device and the plurality of other computing devices may be requesting different content items. Substantially aligned bitrate requests for different content items received from the computing device and the plurality of other computing devices may be indicative of an impairment related to a deployment scheme of the CDN associated with the entire service group, such as a DOCSIS channel, a CMTS, a set of QAM channels, etc., that are shared by the computing device and the and the plurality of other computing devices (e.g., a regional impairment). The two or more DOCSIS service groups may use a same DOCSIS CMTS, thereby indicating that the at least one source of the impairment may be related to node splits and/or amplifiers associated with the CMTS. As another example, the service groups may be part of a fiber-based network. In such an example, the computing devices may use a same optical line terminator ("OLT"), thereby indicating that the at least one source of the impairment may be related to one or more optical network units.

As another example, it may be determined that the bitrate requests indicated by the first session data and the further session data are not substantially aligned. Using the further session data, it may be determined that substantially unaligned bitrate requests for different content items across the service group are indicative of an impairment related to a deployment scheme that may not affect the entire service group. In such a scenario, it may be determined the impairment is related to the first deployment scheme (e.g., a first set of QAM channels, a first DOCSIS channel) but not the second deployment scheme (e.g., a second set of QAM channels, a second DOCSIS channel)—or vice versa.

At step 430, a notification indicating the at least one source of the impairment may be generated. The notification may be sent to an entity of the CDN, such as an origin, a transcoder, a cache and/or a datacenter, indicating the at least one source of the impairment. At step 440, a maintenance procedure may be performed by an entity of the CDN based on the notification. As an example, the maintenance procedure may include triggering one or more alarms at a control station of the CDN and/or causing additional monitoring to commence by the CDN. As another example, the maintenance procedure may include assigning additional resources (e.g., service teams) to a location (e.g., the CMTS) for equipment correction and/or replacement and/or notifying a provider of the requested content of an issue existing outside the CDN. As a further example, the maintenance procedure may include causing one or more of the computing devices to use an alternate DOCSIS service group, and/or causing one or more of the computing devices to use another mode of network transport other than DOCSIS to receive further content, such as wireless/cellular services. Additionally, the maintenance procedure may include scaling certain systems within the CDN and/or restarting them. As another example, the maintenance procedure may include restricting or limiting new service flows—or even service types—to one or both of the computing devices (e.g., "best effort" internet traffic permitted versus restriction/limitation of certain video traffic). In this way, available bandwidth for the DOCSIS service group may be increased, or at least not further decreased, while maintaining service in the DOCSIS service group.

Figure 5:
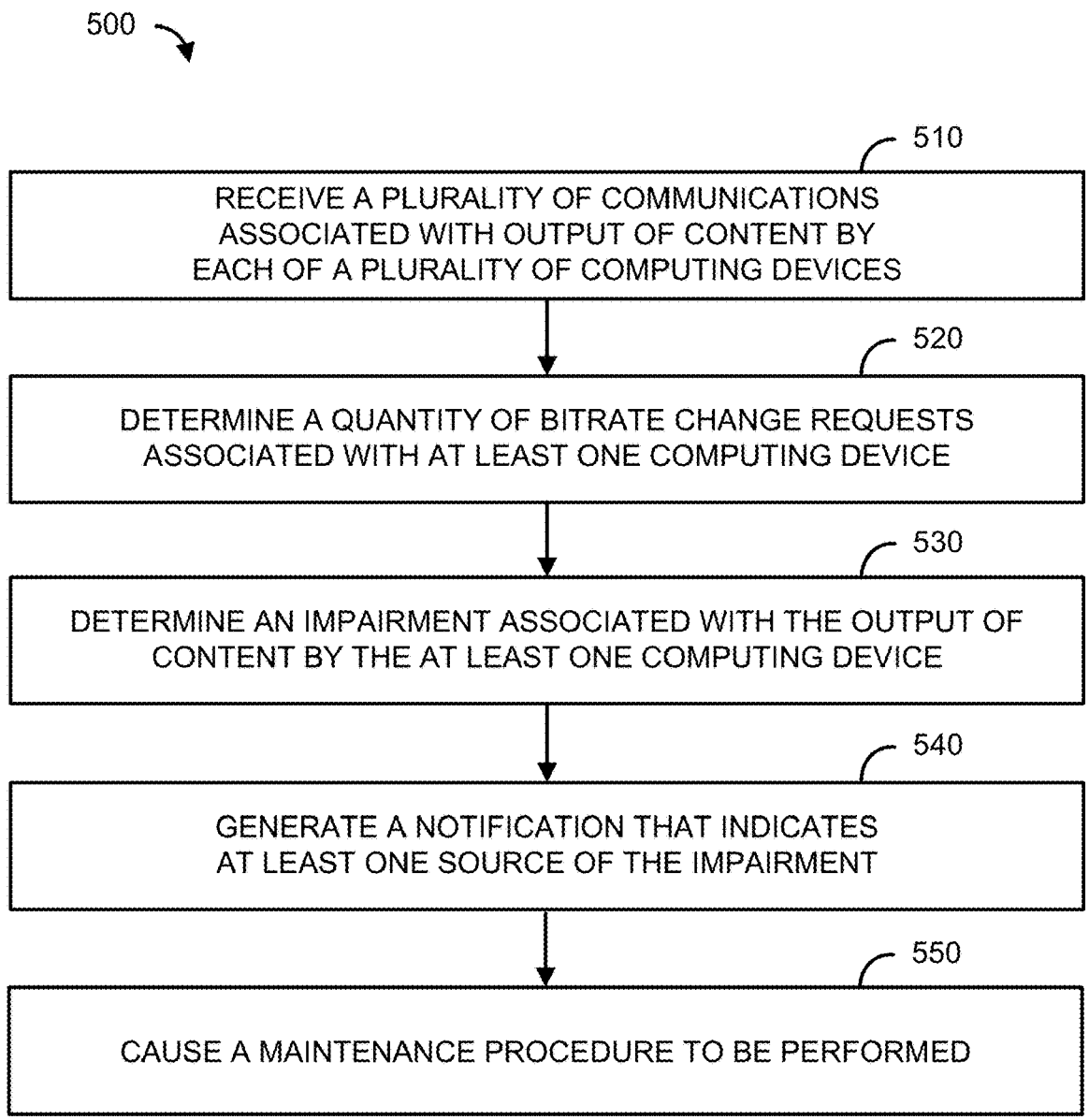
FIG. 5 shows a flowchart of an example method for content delivery.

Turning now to FIG. 5, a flowchart of an example method 500 for improved content delivery in accordance with the present description in shown. The method 500 may be implemented using the system 100 of FIG. 1 or the system 200 of FIG. 2. For example, the method 500 may be performed by the network component 129 or the M&A Module 202.

At step 510, a plurality of communications may be received from a plurality of computing devices in communication with a content distribution network ("CDN"). Each of the plurality of computing devices may be a computing device configured to receive and/or present content, such as the computing device 212, the computing device 216, the media device 120, or the mobile device 124. The plurality of communications may be upstream communications as described herein. The plurality of communications may be generated by each of the plurality of the computing devices during output of content during corresponding content sessions. As another example, the plurality of communications may be generated by each computing device of each of the plurality of groups of computing devices during output of content during a corresponding content session for each computing device. The plurality of communications may be aggregated into session data. For example, the plurality of communications may include a heartbeat sent by each of the plurality of the computing devices during the corresponding content sessions. The plurality of communication may indicate a change in a bitrate associated with output of content by each of the plurality of computing device during the corresponding content sessions. For example, the plurality of computing devices may each request the content at a plurality of bitrates over a period of time during the corresponding content sessions, and the session data may indicate a number of instances and/or a frequency with which each of the plurality of the computing devices changed from one of the plurality of bitrates to another. These requests for a different bitrate may be referred to herein as "bitrate change requests."

At step 520, a quantity of bitrate change requests associated with at least one computing device of the plurality of computing devices may be determined. The quantity of bitrate change requests may be determined based on the session data. The quantity of bitrate change requests may be determined to satisfy a threshold. The quantity of bitrate change requests satisfying the threshold may be indicative of an impairment associated with the output of the content by the at least one computing device For example, the impairment may be determined to exist based on the session data indicating that the quantity of bitrate changes (e.g., based on the plurality of communications) satisfy the threshold. The threshold may be satisfied when the quantity of bitrate change requests made by the at least one computing device exceeds a quantitative threshold (e.g., more than 10 bitrate change requests are sent by the at least one computing device during the session) and/or a frequency threshold (e.g., more than 5 bitrate change requests are sent by the at least one computing device within a range of time during the session).

At step 530, an impairment associated with the output of content by the at least one computing device may be determined. An alignment of the quantity of bitrate change requests associated with the at least one computing device (hereinafter, a "first quantity of bitrate changes requests") and a further quantity of bitrate change requests associated with another computing device of the plurality (hereinafter, a "second quantity of bitrate changes requests") may be indicative of at least one source of the impairment (e.g., a cause of the impairment). The at least one source of the impairment may be related to one or more packaging and/or transcoding errors associated with the content requested by the at least one computing device. The at least one source of the impairment associated with the output of the content by the at least one computing device may be determined to be related to the packaging and/or transcoding of the content based on the first quantity of bitrate change requests and the second quantity of bitrate change requests being aligned (e.g., all are sent within 25 milliseconds). For example, the at least one computing device and the other computing device may each request a same content item, and it may be determined whether the first quantity of bitrate change requests and the second quantity of bitrate change requests are sent within a specified frequency such that the timing of the requests are substantially aligned (e.g., within 25 milliseconds). Substantially aligned bitrate requests for a same content item may be indicative of an impairment related to packaging and/or transcoding errors. The content may be packaged and/or transcoded by a packager/transcoder of the CDN. The at least one source of the impairment may be determined to be related to the packaging and/or transcoding of the content despite the packager/transcoder having not indicated any such impairment exists (e.g., no operational issue(s) reported).

As another example, the at least one computing device and the other computing device may each be requesting a same content item, and it may be determined that the first quantity of bitrate change requests and the second quantity of bitrate change requests are not substantially aligned. That is, it may be determined that the first quantity of bitrate change requests and the second quantity of bitrate change requests are not sent by the at least one computing device and the other computing device within a specified frequency. Substantially un-aligned bitrate requests for the same content item may be indicative of an impairment related to network congestion and/or physical network impairments.

As another example, the at least one source of the impairment may be related to a deployment scheme of the CDN (e.g., a delivery protocol), such as a Data Over Cable Service Interface Specification (DOCSIS) service group(s). The plurality of computing devices may all be part of a DOCSIS service group and receive the content from a common source (e.g., an origin and/or a cache of the CDN). The at least one computing device may be part of a first DOCSIS service group, and the plurality of computing devices may be part of a second DOCSIS service group. The DOCSIS service groups may use a same DOCSIS Cable Modem Termination System (CMTS) (e.g., within a same city), or they may use separate DOCSIS CMTSs in close proximity, such as those within a geographic region (e.g., a state). The DOCSIS service group may consist of one or more quadrature amplitude modulation (QAM) channels. The at least one computing device may be using a first deployment scheme to receive first content, while the plurality of other computing devices may be using a second deployment scheme to receive second content. Further upstream communications may be received from each of the at least one computing device and the plurality of other computing devices. The further upstream communications may be aggregated into further session data. The further session data may indicate that each of the at least one computing device and the plurality of other computing devices requested a different bitrate of content within a threshold range of time (e.g., within 25 milliseconds) and/or a threshold number of instances (e.g., 10 times in the same content session).

The at least one source of the impairment may be determined to be related to the deployment scheme of the CDN (e.g., a delivery protocol) and/or issues relating to a transport network based on the session data indicating the requests for a differing bitrate occurring for all of the computing devices being substantially aligned. For example, the at least one computing device and the plurality of other computing devices may each be requesting different content items. Substantially aligned bitrate change requests for different content items may be indicative of an impairment related to a deployment scheme of the CDN associated with an entire service group, such as a DOCSIS channel, a CMTS, a set of QAM channels, etc., that are shared by each of the plurality computing devices (e.g., a regional impairment). The two or more DOCSIS service groups may use a same DOCSIS CMTS, thereby indicating that the at least one source of the impairment may be related to node splits and/or amplifiers associated with the CMTS. As another example, the service groups may be part of a fiber-based network. In such an example, the computing devices may use a same optical line terminator ("OLT"), thereby indicating that the at least one source of the impairment may be related to one or more optical network units.

As another example, it may be determined that the bitrate requests indicated by the session data are not substantially aligned. It may be determined that substantially un-aligned bitrate requests for different content items across a service group are indicative of an impairment related to a deployment scheme that may not affect the entire service group. In such a scenario, it may be determined the impairment is related to the first deployment scheme (e.g., a first set of QAM channels, a first DOCSIS channel) used by one or more of the plurality of computing devices but not the second deployment scheme (e.g., a second set of QAM channels, a second DOCSIS channel) used by the other computing devices of the plurality— or vice versa.

At step 540, a notification indicating the at least one source of the impairment may be generated. The notification may be sent to an entity of the CDN, such as an origin, a transcoder, a cache and/or a datacenter, indicating the at least one source of the impairment. At step 550, a maintenance procedure may be performed by an entity of the CDN based on the notification. As an example, the maintenance procedure may include triggering one or more alarms at a control station of the CDN and/or causing additional monitoring to commence by the CDN. As another example, the maintenance procedure may include assigning additional resources (e.g., service teams) to a location (e.g., the CMTS) for equipment correction and/or replacement and/or notifying a provider of the requested content of an issue existing outside the CDN. As a further example, the maintenance procedure may include causing one or more of the computing devices to use an alternate DOCSIS service group, and/or causing one or more of the computing devices to use another mode of network transport other than DOCSIS to receive further content, such as wireless/cellular services. Additionally, the maintenance procedure may include scaling certain systems within the CDN and/or restarting them. As another example, the maintenance procedure may include restricting or limiting new service flows—or even service types—to one or more of the computing devices (e.g., "best effort" internet traffic permitted versus restriction/limitation of certain video traffic). In this way, available bandwidth for the DOCSIS service group may be increased, or at least not further decreased, while maintaining service in the DOCSIS service group.

Figure 6:
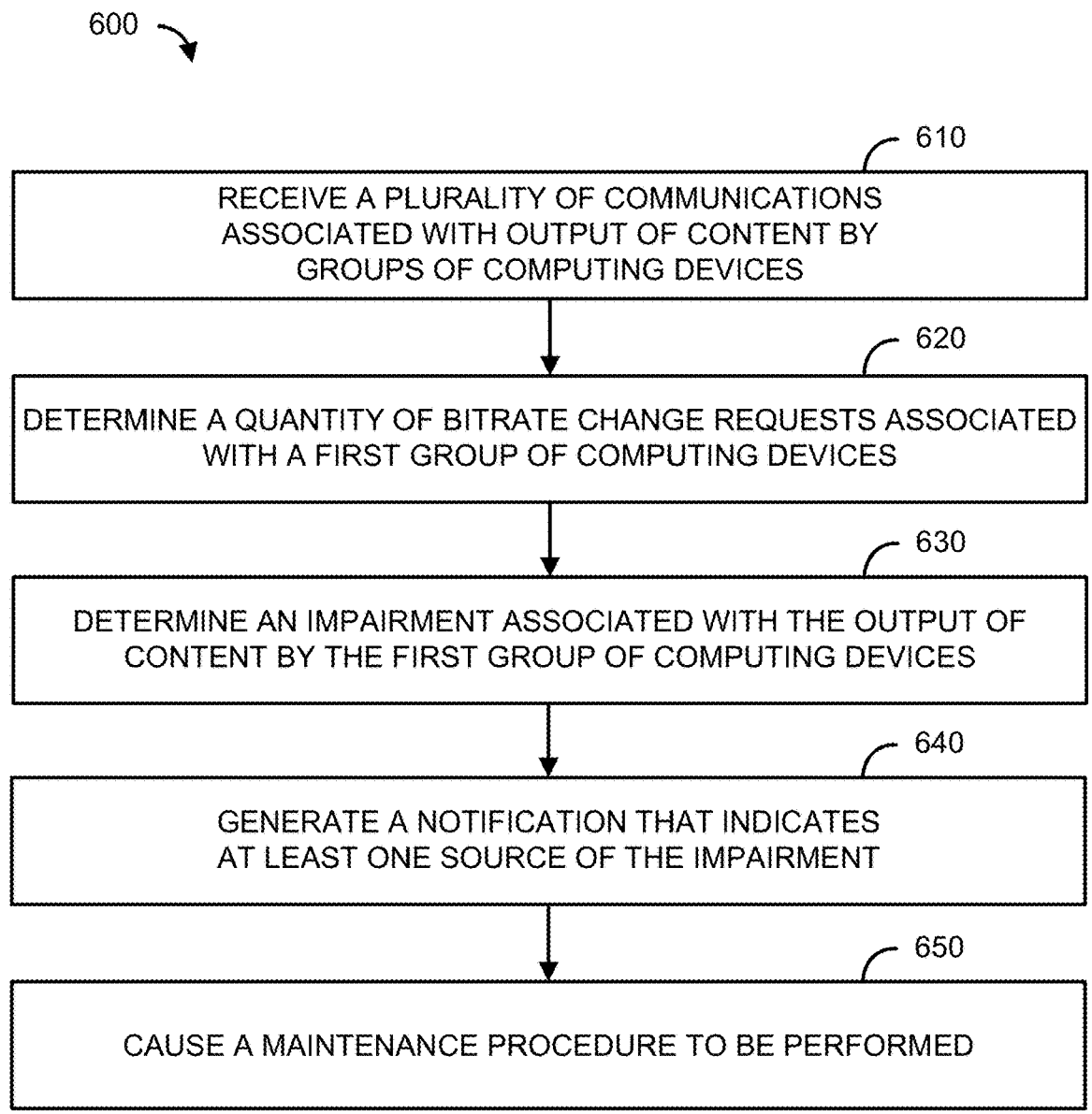
FIG. 6 shows a flowchart of an example method for content delivery.

Turning now to FIG. 6, a flowchart of an example method 600 for improved content delivery in accordance with the present description in shown. The method 600 may be implemented using the system 100 of FIG. 1 or the system 200 of FIG. 2. For example, the method 600 may be performed by the network component 129 or the M&A Module 202.

At step 610, a plurality of communications may be received from each of a plurality of groups of computing devices in communication with a content distribution network ("CDN"). Each of the plurality of groups of computing devices may include one or more computing devices configured to receive and/or present content, such as the computing device 212, the computing device 216, the media device 120, or the mobile device 124. The plurality of communications may be upstream communications as described herein. The plurality of communications may be generated by each of the plurality of groups of computing devices during output of content during corresponding content sessions. As another example, the plurality of communications may be generated by each computing device of each of the plurality of groups of computing devices during output of content during a corresponding content session for each computing device. The plurality of communications may be aggregated into session data. For example, the plurality of communications may include a heartbeat sent by each of the plurality of groups of computing devices during the corresponding content sessions. The plurality of communication may indicate a change in a bitrate associated with output of content by each computing device of the plurality of groups of computing devices during a plurality of content sessions. For example, each computing device of the plurality of groups of computing devices may request the content at a plurality of bitrates over a period of time during the plurality of content sessions. The session data may indicate a number of instances and/or a frequency with which each computing device of the plurality of groups of computing devices changed from one of the plurality of bitrates to another. These requests for a different bitrate may be referred to herein as "bitrate change requests."

At step 620, a quantity of bitrate change requests associated with a first group of the plurality of groups of computing devices may be determined. The quantity of bitrate change requests may be determined based on the session data. The quantity of bitrate change requests may be determined to satisfy a threshold. The quantity of bitrate change requests satisfying the threshold may be indicative of an impairment associated with the output of the content by the first group of computing devices. For example, the impairment may be determined to exist based on the session data indicating that the quantity of bitrate change requests (e.g., based on the plurality of communications) satisfy the threshold. The threshold may be satisfied when a quantity of computing devices of the first group that send bitrate change requests exceeds a quantitative threshold (e.g., more than 10 computing devices sent bitrate requests during the session) and/or a frequency threshold (e.g., more than 5 bitrate requests are sent by the quantity of computing devices within a range of time during the session). As another example, the threshold may be satisfied when the quantity of bitrate change requests made by all of the computing devices of the first group, collectively, exceeds a quantitative threshold (e.g., more than 50 bitrate change requests are sent by the whole group during the session) and/or a frequency threshold (e.g., more than 5 bitrate requests are sent by each computing device in the group within a range of time during the session). As a further example, the threshold may be satisfied when the quantity of bitrate change requests made by at least one computing device of the first group exceeds a quantitative threshold (e.g., more than 10 bitrate change requests are sent by the at least one computing device during the session) and/or a frequency threshold (e.g., more than 5 bitrate change requests are sent by the at least one computing device within a range of time during the session).

At step 630, an impairment associated with the output of content by the first group of computing devices may be determined. An alignment of the quantity of bitrate change requests may be indicative of at least one source of the impairment (e.g., a cause of the impairment). The at least one source of the impairment may be related to one or more packaging and/or transcoding errors associated with the content requested by each computing device of the first group. The at least one source of the impairment associated with the output of the content by the first group may be determined to be related to the packaging and/or transcoding of the content based on the quantity of bitrate change requests being aligned (e.g., all are sent within 25 milliseconds). For example, each computing device of the first group may request a same content item, and it may be determined whether the quantity of bitrate change requests are sent by each computing device of the first group within a specified frequency such that the timing of the requests are substantially aligned (e.g., within 25 milliseconds). Substantially aligned bitrate requests for a same content item may be indicative of an impairment related to packaging and/or transcoding errors. The content may be packaged and/or transcoded by a packager/transcoder of the CDN. The at least one source of the impairment may be determined to be related to the packaging and/or transcoding of the content despite the packager/transcoder having not indicated any such impairment exists (e.g., no operational issue(s) reported).

As another example, each computing device of the first group may be requesting a same content item, and it may be determined that the bitrate requests are not substantially aligned. That is, it may be determined that the quantity of bitrate change requests are not sent by each computing device of the first group within a specified frequency. Substantially un-aligned bitrate change requests for the same content item may be indicative of an impairment related to network congestion and/or physical network impairments.

As another example, the at least one source of the impairment may be related to a deployment scheme of the CDN (e.g., a delivery protocol), such as a Data Over Cable Service Interface Specification (DOCSIS) service group(s). The plurality of groups of computing devices may all be part of a DOCSIS service group and receive the content from a common source (e.g., an origin and/or a cache of the CDN). The first group may be part of a first DOCSIS service group, and the remaining computing devices may be part of a second DOCSIS service group. The DOCSIS service groups may use a same DOCSIS Cable Modem Termination System (CMTS) (e.g., within a same city), or they may use separate DOCSIS CMTSs in close proximity, such as those within a geographic region (e.g., a state). The DOCSIS service group may consist of one or more quadrature amplitude modulation (QAM) channels. The first group may be using a first deployment scheme to receive first content, while the remaining computing devices may be using a second deployment scheme to receive second content. Further upstream communications may be received from the plurality of groups of computing devices. The further upstream communications may be aggregated into further session data. The further session data may indicate that each computing device of the plurality of groups of computing devices requested a different bitrate of content within a threshold range of time (e.g., within 25 milliseconds) and/or a threshold number of instances (e.g., 10 times in the same content session).

The at least one source of the impairment may be determined to be related to the deployment scheme of the CDN (e.g., a delivery protocol) and/or issues relating to a transport network based on the session data indicating the requests for a differing bitrate occurring for all of the computing devices being substantially aligned. For example, each computing device may be requesting a different content item. Substantially aligned bitrate change requests for different content items may be indicative of an impairment related to a deployment scheme of the CDN associated with the first group as well as the remaining computing devices, such as a DOCSIS channel, a CMTS, a set of QAM channels, etc., that are shared by the each computing device (e.g., a regional impairment). The two or more DOCSIS service groups may use a same DOCSIS CMTS, thereby indicating that the at least one source of the impairment may be related to node splits and/or amplifiers associated with the CMTS. As another example, the service groups may be part of a fiber-based network. In such an example, the computing devices may use a same optical line terminator ("OLT"), thereby indicating that the at least one source of the impairment may be related to one or more optical network units.

As another example, it may be determined that the quantity of bitrate change requests are not substantially aligned. It may be determined that substantially un-aligned bitrate change requests for different content items across the first group and the remaining groups of computing devices are indicative of an impairment related to a deployment scheme that may not affect both the first group and the remaining groups of computing devices. In such a scenario, it may be determined the impairment is related to the first deployment scheme (e.g., a first set of QAM channels, a first DOCSIS channel) but not the second deployment scheme (e.g., a second set of QAM channels, a second DOCSIS channel)—or vice versa At step 640, a notification indicating at least one source of the impairment may be generated. The notification may be sent to an entity of the CDN, such as an origin, a transcoder, a cache and/or a datacenter, indicating the at least one source of the impairment. At step 650, a maintenance procedure may be performed by an entity of the CDN based on the notification. As an example, the maintenance procedure may include triggering one or more alarms at a control station of the CDN and/or causing additional monitoring to commence by the CDN. As another example, the maintenance procedure may include assigning additional resources (e.g., service teams) to a location (e.g., the CMTS) for equipment correction and/or replacement and/or notifying a provider of the requested content of an issue existing outside the CDN. As a further example, the maintenance procedure may include causing one or more of the computing devices to use an alternate DOCSIS service group, and/or causing one or more of the computing devices to use another mode of network transport other than DOCSIS to receive further content, such as wireless/cellular services. Additionally, the maintenance procedure may include scaling certain systems within the CDN and/or restarting them. As another example, the maintenance procedure may include restricting or limiting new service flows—or even service types—to one or more of the computing devices (e.g., "best effort" internet traffic permitted versus restriction/limitation of certain video traffic). In this way, available bandwidth for the DOCSIS service group may be increased, or at least not further decreased, while maintaining service in the DOCSIS service group.

Figure 7:
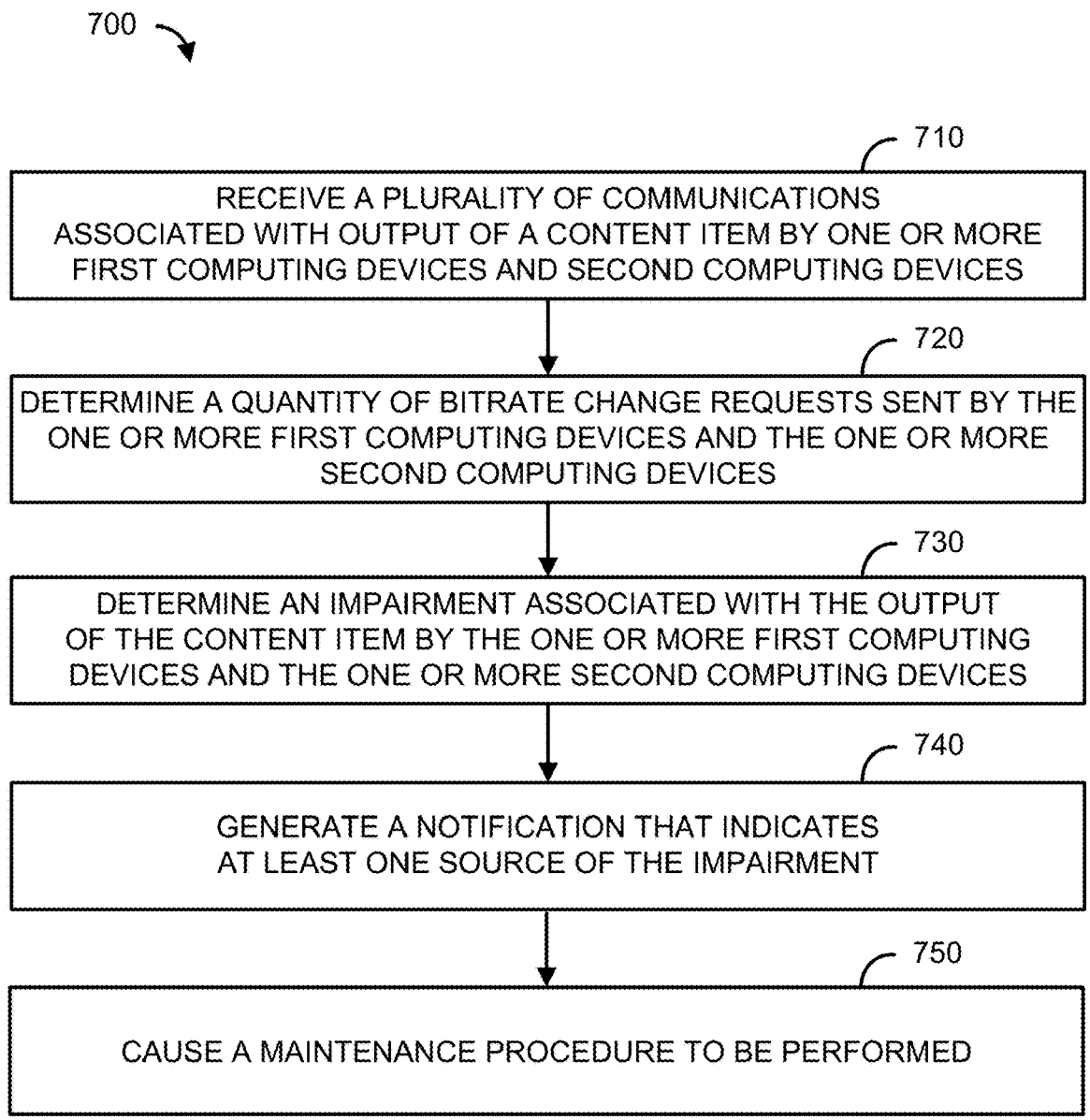
FIG. 7 shows a flowchart of an example method for content delivery.

Turning now to FIG. 7, a flowchart of an example method 700 for improved content delivery in accordance with the present description in shown. The method 700 may be implemented using the system 100 of FIG. 1 or the system 200 of FIG. 2. For example, the method 700 may be performed by the network component 129 or the M&A Module 202.

At step 710, a plurality of communications may be received from a plurality of computing devices in communication with a content distribution network ("CDN"). Each of the plurality of computing devices may be a computing device configured to receive and/or present content, such as the computing device 212, the computing device 216, the media device 120, or the mobile device 124. The plurality of communications may be upstream communications as described herein. The plurality of communications may be generated by each of the plurality of the computing devices during output of a same content item during corresponding content sessions. The plurality of communications may be aggregated into session data. For example, the plurality of communications may include a heartbeat sent by each of the plurality of the computing devices during the corresponding content sessions. The plurality of communication may indicate a change in a bitrate associated with output of the content item by each of the plurality of computing devices during the corresponding content sessions. For example, the plurality of computing devices may each request the content item at a plurality of bitrates over a period of time during the corresponding content sessions, and the session data may indicate a number of instances and/or a frequency with which each of the plurality of the computing devices changed from one of the plurality of bitrates to another. These requests for a different bitrate may be referred to herein as "bitrate change requests."

At step 720, a quantity of bitrate change requests associated with one or more first computing devices and one or more second computing devices of the plurality of computing devices may be determined. The quantity of bitrate change requests may be determined based on the session data. The quantity of bitrate change requests may be determined to satisfy a threshold. The quantity of bitrate change requests satisfying the threshold may be indicative of an impairment associated with the output of the content item by the one or more first computing devices and the one or more second computing devices. For example, the impairment may be determined to exist based on the session data indicating that the quantity of bitrate change requests (e.g., based on the plurality of communications) satisfy the threshold. The threshold may be satisfied when the quantity of bitrate change requests made by the one or more first computing devices and the one or more second computing devices exceeds a quantitative threshold (e.g., more than 10 bitrate change requests collectively are sent by each computing device during the session) and/or a frequency threshold (e.g., more than 5 bitrate change requests are sent by the computing devices within a range of time during the session).

At step 730, an impairment associated with the output of content by the one or more first computing devices and the one or more second computing devices may be determined. An alignment of the quantity of bitrate change requests associated with the one or more first computing devices (hereinafter, a "first quantity of bitrate changes requests") and the quantity of bitrate change requests associated with the one or more second computing devices of the plurality (hereinafter, a "second quantity of bitrate changes requests") may be indicative of at least one source of the impairment (e.g., a cause of the impairment). The at least one source of the impairment may be related to one or more packaging and/or transcoding errors associated with the content requested by at least one computing device. The at least one source of the impairment associated with the output of the content by the one or more first computing devices and the one or more second computing devices may be determined to be related to the packaging and/or transcoding of the content based on the first quantity of bitrate change requests and the second quantity of bitrate change requests being aligned (e.g., all are sent within 25 milliseconds). For example, it may be determined whether the first quantity of bitrate change requests and the second quantity of bitrate change requests are sent within a specified frequency such that the timing of the requests are substantially aligned (e.g., within 25 milliseconds). Substantially aligned bitrate requests for the content item may be indicative of an impairment related to packaging and/or transcoding errors. The content may be packaged and/or transcoded by a packager/transcoder of the CDN. The at least one source of the impairment may be determined to be related to the packaging and/or transcoding of the content despite the packager/transcoder having not indicated any such impairment exists (e.g., no operational issue(s) reported).

At step 740, a notification indicating the at least one source of the impairment may be generated. The notification may be sent to an entity of the CDN, such as an origin, a transcoder, a cache and/or a datacenter, indicating the at least one source of the impairment. At step 750, a maintenance procedure may be performed by an entity of the CDN based on the notification. As an example, the maintenance procedure may include triggering one or more alarms at a control station of the CDN and/or causing additional monitoring to commence by the CDN. As another example, the maintenance procedure may include assigning additional resources (e.g., service teams) to a location (e.g., the CMTS) for equipment correction and/or replacement and/or notifying a provider of the requested content of an issue existing outside the CDN. As a further example, the maintenance procedure may include causing one or more of the plurality of computing devices to use an alternate DOCSIS service group, and/or causing one or more of the plurality of computing devices to use another mode of network transport other than DOCSIS to receive further content, such as wireless/cellular services. Additionally, the maintenance procedure may include scaling certain systems within the CDN and/or restarting them. As another example, the maintenance procedure may include restricting or limiting new service flows—or even service types—to one or more of the plurality of computing devices (e.g., "best effort" internet traffic permitted versus restriction/limitation of certain video traffic). In this way, available bandwidth for the DOCSIS service group may be increased, or at least not further decreased, while maintaining service in the DOCSIS service group.

Figure 8:
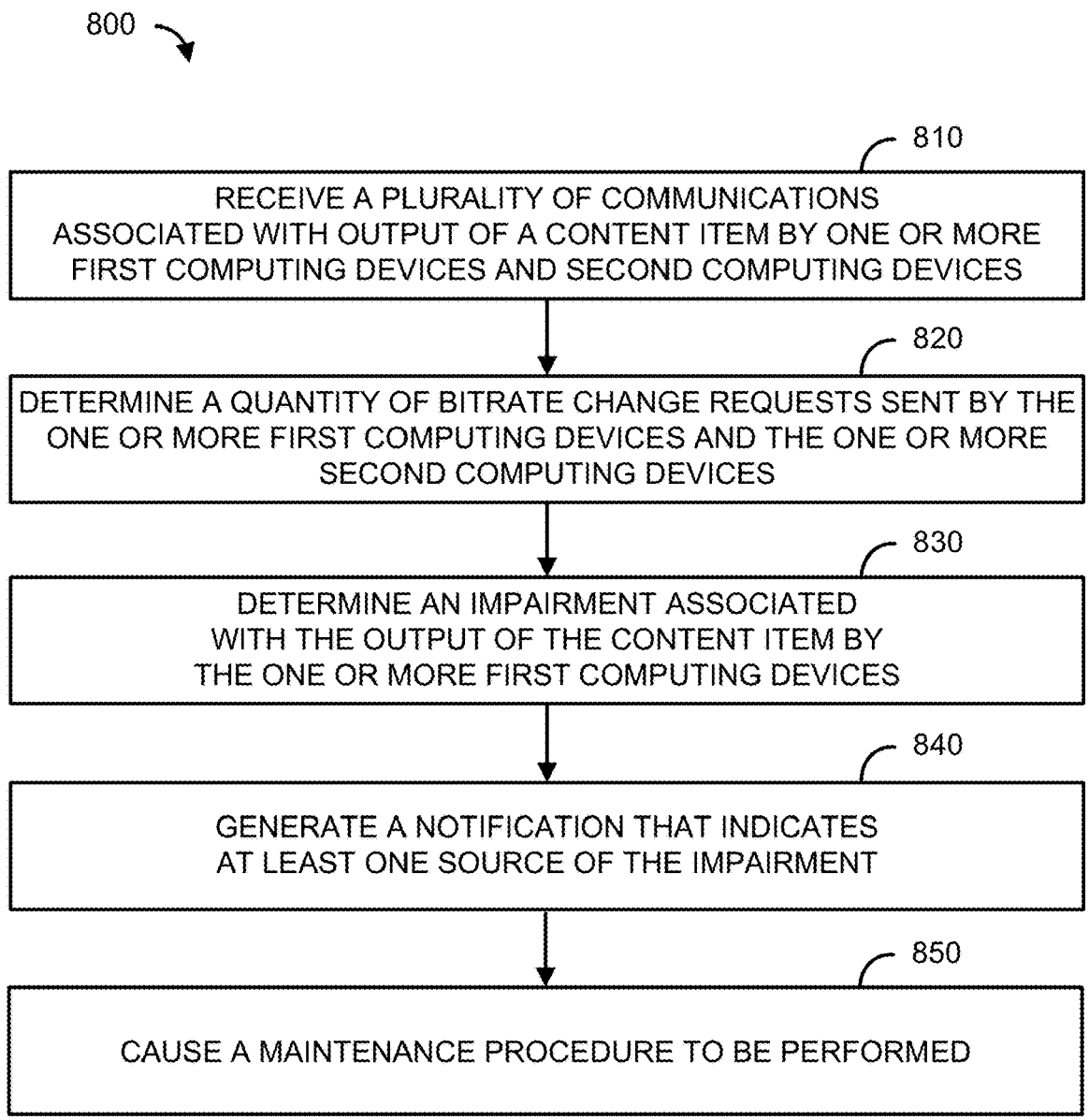
FIG. 8 shows a flowchart of an example method for content delivery.

Turning now to FIG. 8, a flowchart of an example method 800 for improved content delivery in accordance with the present description in shown. The method 800 may be implemented using the system 100 of FIG. 1 or the system 200 of FIG. 2. For example, the method 800 may be performed by the network component 129 or the M&A Module 202.

At step 810, a plurality of communications may be received from a plurality of computing devices in communication with a content distribution network ("CDN"). Each of the plurality of computing devices may be a computing device configured to receive and/or present content, such as the computing device 212, the computing device 216, the media device 120, or the mobile device 124. The plurality of communications may be upstream communications as described herein. The plurality of communications may be generated by each of the plurality of the computing devices during output of a same content item during corresponding content sessions. The plurality of communications may be aggregated into session data. For example, the plurality of communications may include a heartbeat sent by each of the plurality of the computing devices during the corresponding content sessions. The plurality of communication may indicate a change in a bitrate associated with output of the content item by each of the plurality of computing devices during the corresponding content sessions. For example, the plurality of computing devices may each request the content item at a plurality of bitrates over a period of time during the corresponding content sessions, and the session data may indicate a number of instances and/or a frequency with which each of the plurality of the computing devices changed from one of the plurality of bitrates to another. These requests for a different bitrate may be referred to herein as "bitrate change requests."

At step 820, a quantity of bitrate change requests associated with one or more first computing devices and one or more second computing devices of the plurality of computing devices may be determined. The quantity of bitrate change requests may be determined based on the session data. The quantity of bitrate change requests may be determined to satisfy a threshold. The quantity of bitrate change requests satisfying the threshold may be indicative of an impairment associated with the output of the content item by the one or more first computing devices and/or the one or more second computing devices. For example, the impairment may be determined to exist based on the session data indicating that the quantity of bitrate change requests (e.g., based on the plurality of communications) satisfy the threshold. The threshold may be satisfied when the quantity of bitrate change requests made by the one or more first computing devices and/or the one or more second computing devices exceeds a quantitative threshold (e.g., more than 10 bitrate change requests collectively are sent by each computing device during the session) and/or a frequency threshold (e.g., more than 5 bitrate change requests are sent by the computing devices within a range of time during the session).

At step 830, an impairment associated with the output of content by the one or more first computing devices may be determined. A lack of an alignment of the quantity of bitrate change requests associated with the one or more first computing devices (hereinafter, a "first quantity of bitrate changes requests") and the quantity of bitrate change requests associated with the one or more second computing devices of the plurality (hereinafter, a "second quantity of bitrate changes requests") may be indicative of at least one source of the impairment (e.g., a cause of the impairment). The at least one source of the impairment may be related to network congestion and/or physical network impairments. The at least one source of the impairment associated with the output of the content by the one or more first computing devices may be determined to be related to network congestion and/or physical network impairments based on the first quantity of bitrate change requests and the second quantity of bitrate change requests not being aligned (e.g., they are not all sent within 25 milliseconds). For example, it may be determined that the first quantity of bitrate change requests and the second quantity of bitrate change requests are not substantially aligned. That is, it may be determined that the first quantity of bitrate change requests and the second quantity of bitrate change requests are not sent by the one or more first computing devices and the one or more second computing devices within a specified frequency. Substantially un-aligned bitrate requests for the same content item may be indicative of an impairment related to network congestion and/or physical network impairments.

At step 840, a notification indicating the at least one source of the impairment may be generated. The notification may be sent to an entity of the CDN, such as an origin, a transcoder, a cache and/or a datacenter, indicating the at least one source of the impairment. At step 850, a maintenance procedure may be performed by an entity of the CDN based on the notification. As an example, the maintenance procedure may include triggering one or more alarms at a control station of the CDN and/or causing additional monitoring to commence by the CDN. As another example, the maintenance procedure may include assigning additional resources (e.g., service teams) to a location (e.g., the CMTS) for equipment correction and/or replacement and/or notifying a provider of the requested content of an issue existing outside the CDN. As a further example, the maintenance procedure may include causing one or more of the plurality of computing devices to use an alternate DOCSIS service group, and/or causing one or more of the plurality of computing devices to use another mode of network transport other than DOCSIS to receive further content, such as wireless/cellular services. Additionally, the maintenance procedure may include scaling certain systems within the CDN and/or restarting them. As another example, the maintenance procedure may include restricting or limiting new service flows—or even service types—to one or more of the plurality of computing devices (e.g., "best effort" internet traffic permitted versus restriction/limitation of certain video traffic). In this way, available bandwidth for the DOCSIS service group may be increased, or at least not further decreased, while maintaining service in the DOCSIS service group.

Figure 9:
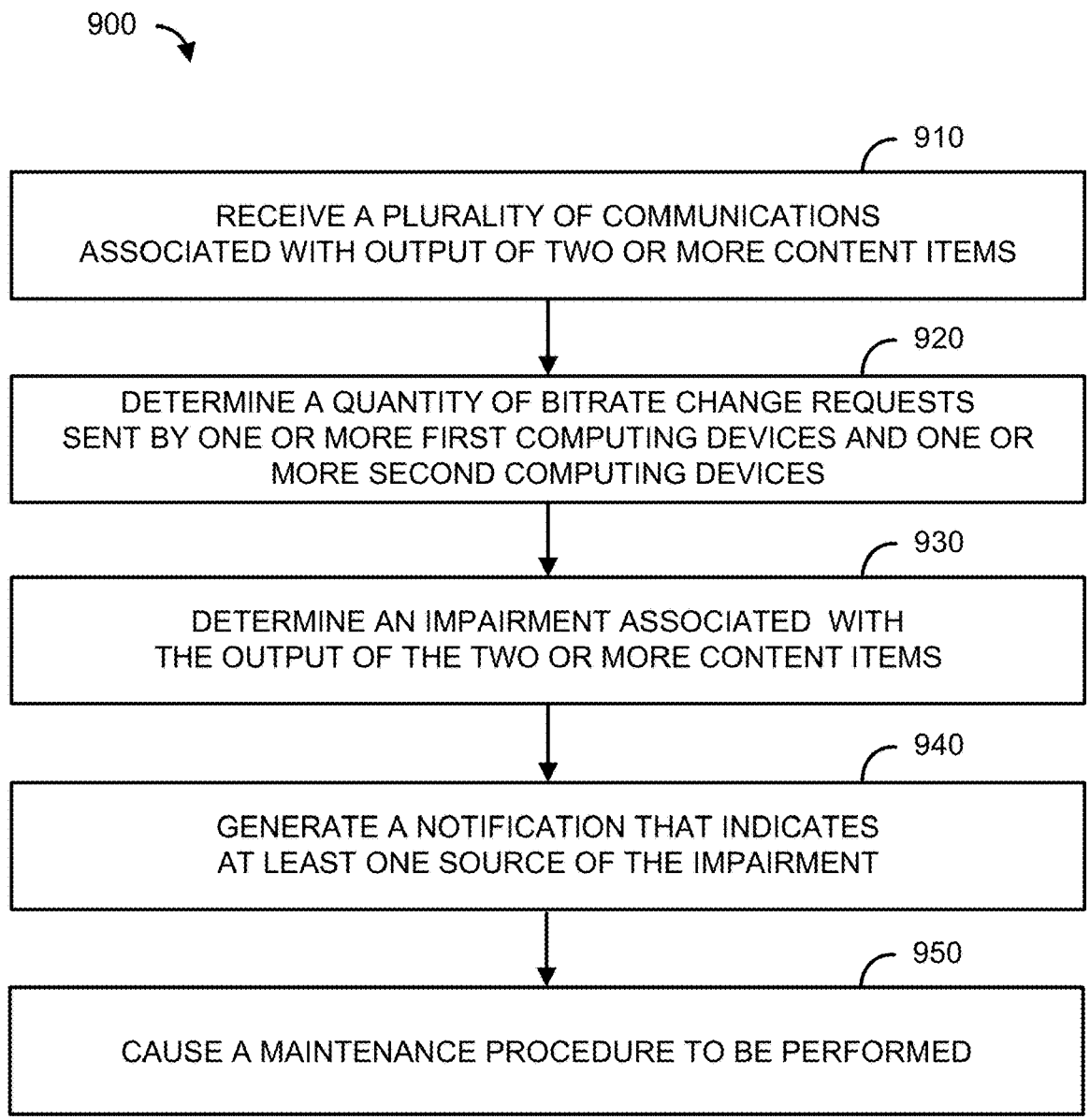
FIG. 9 shows a flowchart of an example method for content delivery.

Turning now to FIG. 9, a flowchart of an example method 900 for improved content delivery in accordance with the present description in shown. The method 900 may be implemented using the system 100 of FIG. 1 or the system 200 of FIG. 2. For example, the method 900 may be performed by the network component 129 or the M&A Module 202.

At step 910, a plurality of communications may be received from a plurality of computing devices in communication with a content distribution network ("CDN"). Each of the plurality of computing devices may be a computing device configured to receive and/or present content, such as the computing device 212, the computing device 216, the media device 120, or the mobile device 124. The plurality of communications may be upstream communications as described herein. The plurality of communications may be generated by each of the plurality of the computing devices during output of two or more content items during corresponding content sessions. The plurality of communications may be aggregated into session data. For example, the plurality of communications may include a heartbeat sent by each of the plurality of the computing devices during the corresponding content sessions. The plurality of communications may indicate a change in a bitrate associated with output of a content item of the two or more content items by each of the plurality of computing devices during the corresponding content sessions. For example, the plurality of computing devices may each request the content item at a plurality of bitrates over a period of time during the corresponding content sessions, and the session data may indicate a number of instances and/or a frequency with which each of the plurality of the computing devices changed from one of the plurality of bitrates to another. These requests for a different bitrate may be referred to herein as "bitrate change requests."

At step 920, a quantity of bitrate change requests associated with one or more first computing devices and one or more second computing devices of the plurality of computing devices may be determined. The quantity of bitrate change requests may be determined based on the session data. The quantity of bitrate change requests may be determined to satisfy a threshold. The quantity of bitrate change requests satisfying the threshold may be indicative of an impairment associated with the output of the two or more content items by the plurality of computing devices. For example, the impairment may be determined to exist based on the session data indicating that the quantity of bitrate change requests (e.g., based on the plurality of communications) satisfy the threshold. The threshold may be satisfied when the quantity of bitrate change requests made by the one or more first computing devices and the one or more second computing devices exceeds a quantitative threshold (e.g., more than 10 bitrate change requests collectively are sent by each computing device during the session) and/or a frequency threshold (e.g., more than 5 bitrate change requests are sent by the computing devices within a range of time during the session).

At step 930, an impairment associated with the output of content by the one or more first computing devices and the one or more second computing devices may be determined. An alignment of the quantity of bitrate change requests associated with the one or more first computing devices and the quantity of bitrate change requests associated with the one or more second computing devices of the plurality may be indicative of at least one source of the impairment (e.g., a cause of the impairment). The at least one source of the impairment may be related to a deployment scheme of the CDN (e.g., a delivery protocol), such as a Data Over Cable Service Interface Specification (DOCSIS) service group(s). The plurality of computing devices may all be part of a DOCSIS service group and receive the two or more content items from a common source (e.g., an origin and/or a cache of the CDN). The one or more first computing devices may be part of a first DOCSIS service group, and the one or more second computing devices may be part of a second DOCSIS service group. The DOCSIS service groups may use a same DOCSIS Cable Modem Termination System (CMTS) (e.g., within a same city), or they may use separate DOCSIS CMTSs in close proximity, such as those within a geographic region (e.g., a state). The DOCSIS service group may consist of one or more quadrature amplitude modulation (QAM) channels. The one or more first computing devices may be using a first deployment scheme to receive first content, while the one or more second computing devices may be using a second deployment scheme to receive second content. Further upstream communications may be received from each of the one or more first computing devices and the one or more second computing devices. The further upstream communications may be aggregated into further session data. The further session data may indicate that each of the one or more first computing devices and the one or more second devices requested a different bitrate of content within a threshold range of time (e.g., within 25 milliseconds) and/or a threshold number of instances (e.g., 10 times in the same content session).

The at least one source of the impairment may be determined to be related to the deployment scheme of the CDN (e.g., a delivery protocol) and/or issues relating to a transport network based on the session data indicating the requests for a differing bitrate occurring for all of the computing devices being substantially aligned. For example, the one or more first computing devices and the one or more second computing devices may each be requesting different content items. Substantially aligned bitrate change requests for different content items may be indicative of an impairment related to a deployment scheme of the CDN associated with an entire service group, such as a DOCSIS channel, a CMTS, a set of QAM channels, etc., that are shared by each of the plurality computing devices (e.g., a regional impairment). The two or more DOCSIS service groups may use a same DOCSIS CMTS, thereby indicating that the at least one source of the impairment may be related to node splits and/or amplifiers associated with the CMTS. As another example, the service groups may be part of a fiber-based network. In such an example, the computing devices may use a same optical line terminator ("OLT"), thereby indicating that the at least one source of the impairment may be related to one or more optical network units.

At step 940, a notification indicating the at least one source of the impairment may be generated. The notification may be sent to an entity of the CDN, such as an origin, a transcoder, a cache and/or a datacenter, indicating the at least one source of the impairment. At step 950, a maintenance procedure may be performed by an entity of the CDN based on the notification. As an example, the maintenance procedure may include triggering one or more alarms at a control station of the CDN and/or causing additional monitoring to commence by the CDN. As another example, the maintenance procedure may include assigning additional resources (e.g., service teams) to a location (e.g., the CMTS) for equipment correction and/or replacement and/or notifying a provider of the requested content of an issue existing outside the CDN. As a further example, the maintenance procedure may include causing one or more of the plurality of computing devices to use an alternate DOCSIS service group, and/or causing one or more of the plurality of computing devices to use another mode of network transport other than DOCSIS to receive further content, such as wireless/cellular services. Additionally, the maintenance procedure may include scaling certain systems within the CDN and/or restarting them. As another example, the maintenance procedure may include restricting or limiting new service flows—or even service types—to one or more of the plurality of computing devices (e.g., "best effort" internet traffic permitted versus restriction/limitation of certain video traffic). In this way, available bandwidth for the DOCSIS service group may be increased, or at least not further decreased, while maintaining service in the DOCSIS service group.

Figure 10:
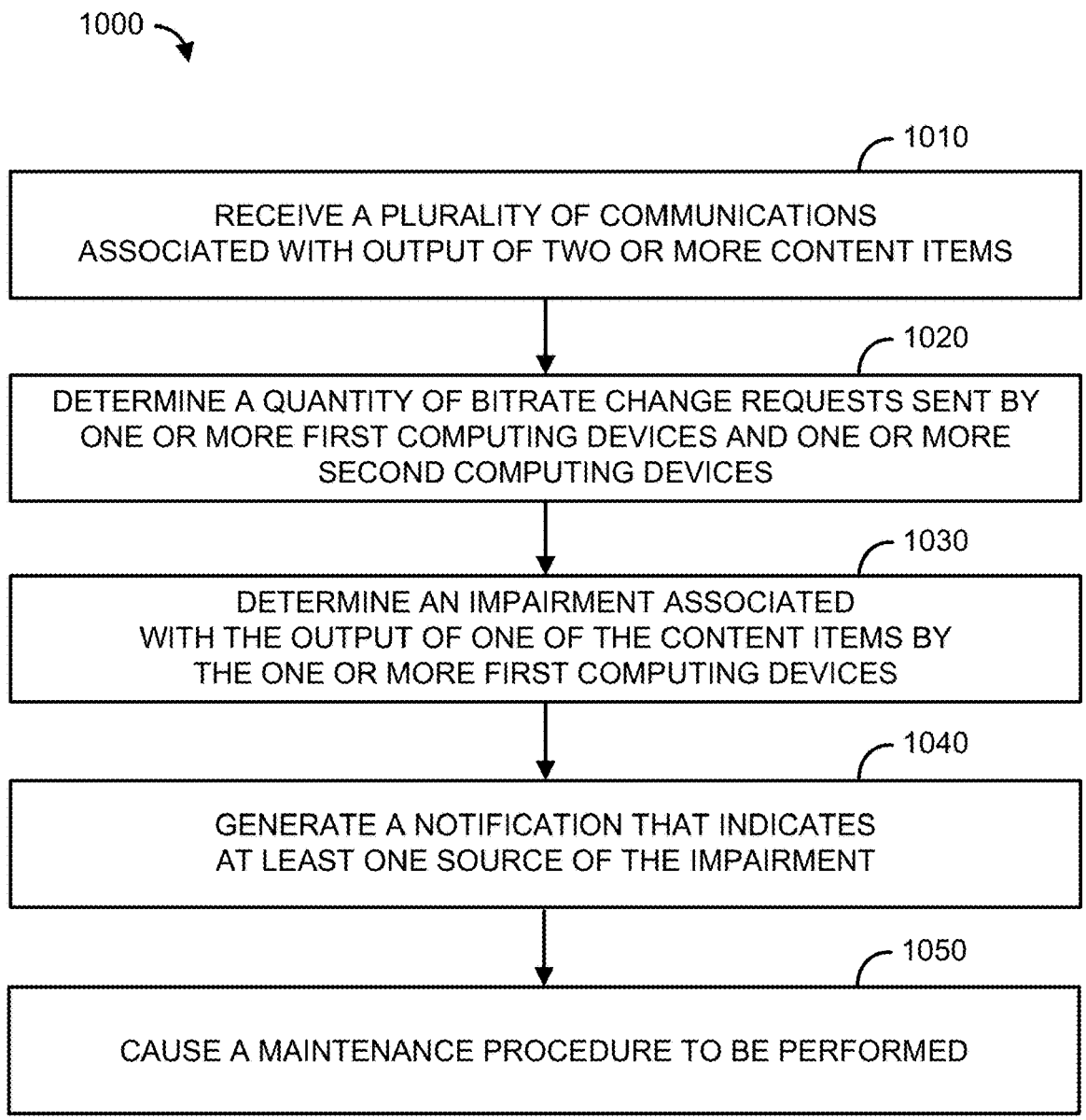
FIG. 10 shows a flowchart of an example method for content delivery.

Turning now to FIG. 10, a flowchart of an example method 1000 for improved content delivery in accordance with the present description in shown. The method 1000 may be implemented using the system 100 of FIG. 1 or the system 200 of FIG. 2. For example, the method 1000 may be performed by the network component 129 or the M&A Module 202.

At step 1010, a plurality of communications may be received from a plurality of computing devices in communication with a content distribution network ("CDN"). Each of the plurality of computing devices may be a computing device configured to receive and/or present content, such as the computing device 212, the computing device 216, the media device 120, or the mobile device 124. The plurality of communications may be upstream communications as described herein. The plurality of communications may be generated by each of the plurality of the computing devices during output of two or more content items during corresponding content sessions. The plurality of communications may be aggregated into session data. For example, the plurality of communications may include a heartbeat sent by each of the plurality of the computing devices during the corresponding content sessions. The plurality of communication may indicate a change in a bitrate associated with output of a content item by each of the plurality of computing devices during the corresponding content sessions. For example, the plurality of computing devices may each request a content item of the two or more content items at a plurality of bitrates over a period of time during the corresponding content sessions, and the session data may indicate a number of instances and/or a frequency with which each of the plurality of the computing devices changed from one of the plurality of bitrates to another. These requests for a different bitrate may be referred to herein as "bitrate change requests."

At step 1020, a quantity of bitrate change requests associated with one or more first computing devices and one or more second computing devices of the plurality of computing devices may be determined. The quantity of bitrate change requests may be determined based on the session data. The quantity of bitrate change requests may be determined to satisfy a threshold. The quantity of bitrate change requests satisfying the threshold may be indicative of an impairment associated with the output of a content item by the first computing device and/or the second computing device. For example, the impairment may be determined to exist based on the session data indicating that the quantity of bitrate change requests (e.g., based on the plurality of communications) satisfy the threshold. The threshold may be satisfied when the quantity of bitrate change requests made by the one or more first computing devices and/or the one or more second computing devices exceeds a quantitative threshold (e.g., more than 10 bitrate change requests collectively are sent by each computing device during the session) and/or a frequency threshold (e.g., more than 5 bitrate change requests are sent by the computing devices within a range of time during the session).

At step 1030, an impairment associated with the output of a content item by the one or more first computing devices may be determined. A lack of an alignment of the quantity of bitrate change requests associated with the one or more first computing devices and the quantity of bitrate change requests associated with the one or more second computing devices of the plurality may be indicative of at least one source of the impairment (e.g., a cause of the impairment). For example, the at least one source of the impairment may be related to a deployment scheme of the CDN (e.g., a delivery protocol), such as a Data Over Cable Service Interface Specification (DOCSIS) service group(s). The one or more first computing devices may be using a first deployment scheme to receive first content, while the one or more second computing devices may be using a second deployment scheme to receive second content. Further upstream communications may be received from each of the one or more first computing devices and the one or more second computing devices. The further upstream communications may be aggregated into further session data, and it may be determined that the bitrate change requests indicated by the further session data are not substantially aligned. It may be determined that substantially un-aligned bitrate change requests for different content items across a service group are indicative of an impairment related to a deployment scheme that may not affect the entire service group. In such a scenario, it may be determined the impairment is related to the first deployment scheme (e.g., a first set of QAM channels, a first DOCSIS channel) used by the first computing device but not the second deployment scheme (e.g., a second set of QAM channels, a second DOCSIS channel) used by the second computing device—or vice versa.

At step 1040, a notification indicating the at least one source of the impairment may be generated. The notification may be sent to an entity of the CDN, such as an origin, a transcoder, a cache and/or a datacenter, indicating the at least one source of the impairment. At step 1050, a maintenance procedure may be performed by an entity of the CDN based on the notification. As an example, the maintenance procedure may include triggering one or more alarms at a control station of the CDN and/or causing additional monitoring to commence by the CDN. As another example, the maintenance procedure may include assigning additional resources (e.g., service teams) to a location (e.g., the CMTS) for equipment correction and/or replacement and/or notifying a provider of the requested content of an issue existing outside the CDN. As a further example, the maintenance procedure may include causing one or more of the plurality of computing devices to use an alternate DOCSIS service group, and/or causing one or more of the plurality of computing devices to use another mode of network transport other than DOCSIS to receive further content, such as wireless/cellular services. Additionally, the maintenance procedure may include scaling certain systems within the CDN and/or restarting them. As another example, the maintenance procedure may include restricting or limiting new service flows—or even service types—to one or more of the plurality of computing devices (e.g., "best effort" internet traffic permitted versus restriction/limitation of certain video traffic). In this way, available bandwidth for the DOCSIS service group may be increased, or at least not further decreased, while maintaining service in the DOCSIS service group.

Figure 11:
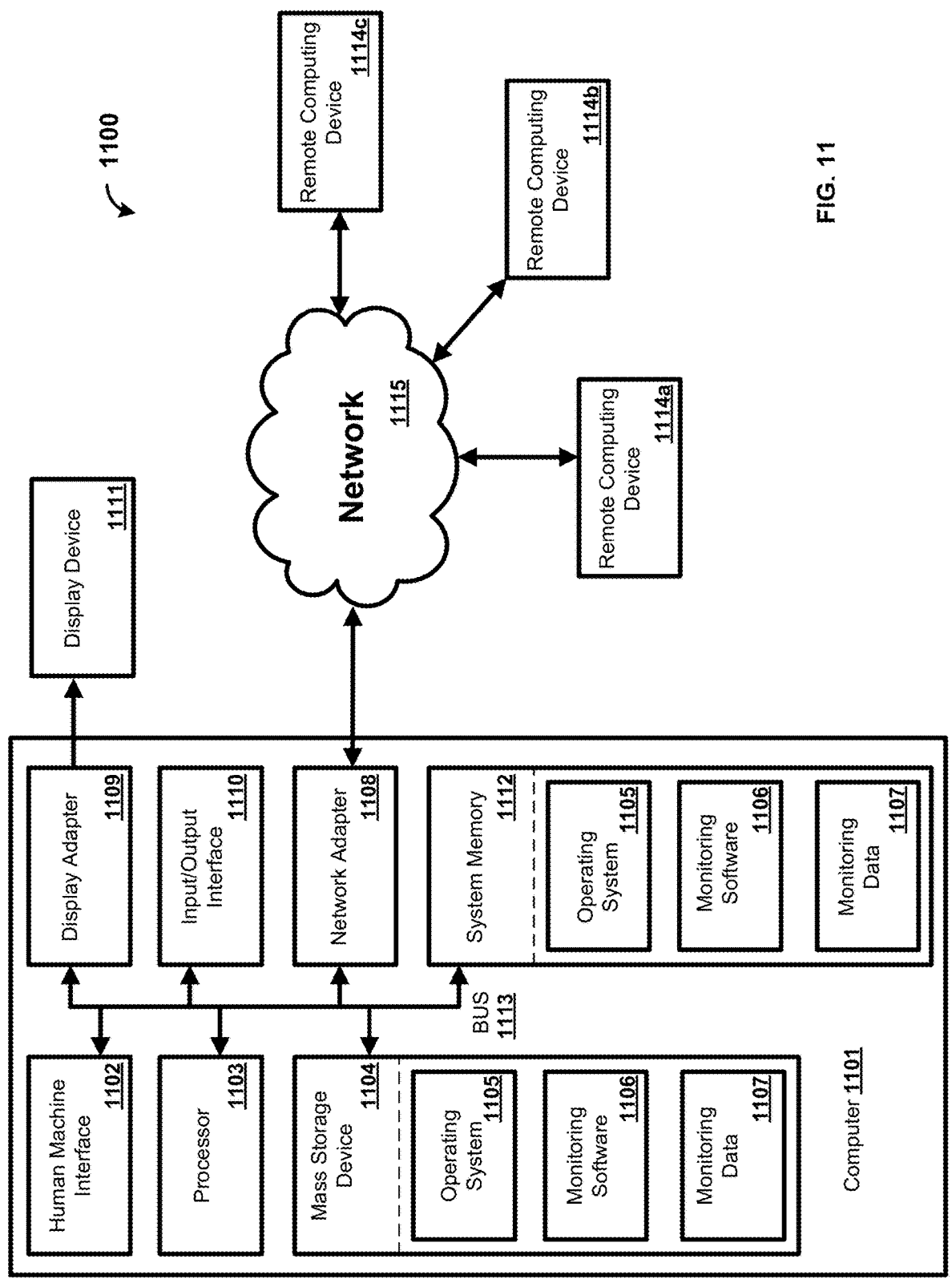
FIG. 11 shows a block diagram of an example computing device for content delivery.

FIG. 11 shows a system 1100 for improved content delivery in accordance with the present description. Each of the media device 120, the mobile device 124, the computing device 212, the computing device 216, or any other computing device configured to receive and/or present content may each be a computer 1101 as shown in FIG. 11. The computer 1101 may comprise one or more processors 1103, a system memory 1112, and a bus 1113 that couples various system components including the one or more processors 1103 to the system memory 1112. In the case of multiple processors 1103, the computer 1101 may utilize parallel computing. The bus 1113 is one or more of several possible types of bus structures, including a memory bus or memory controller, a peripheral bus, an accelerated graphics port, or local bus using any of a variety of bus architectures.

The computer 1101 may operate on and/or comprise a variety of computer readable media (e.g., non-transitory media). The readable media may be any available media that is accessible by the computer 1101 and may include both volatile and non-volatile media, removable and non-removable media. The system memory 1112 has computer readable media in the form of volatile memory, such as random access memory (RAM), and/or non-volatile memory, such as read only memory (ROM). The system memory 1112 may store data such as monitoring data 1107 and/or program modules such as the operating system 1105 and monitoring software 1106 that are accessible to and/or are operated on by the one or more processors 1103. The monitoring software 1106 may use the monitoring data 1107 to perform analytics processes and methods as described herein. For example, an impairment associated with output of content may be determined by the computer 1101 using the monitoring software 1106 and the monitoring data 1107. Data relating to the impairment and determined source(s) thereof may be stored in the system memory 1112.

The computer 1101 may also have other removable/non-removable, volatile/non-volatile computer storage media. FIG. 11 shows the mass storage device 1104 which may provide non-volatile storage of computer code, computer readable instructions, data structures, program modules, and other data for the computer 1101. The mass storage device 1104 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1104, such as the operating system 1105 and the monitoring software 1106. Each of the operating system 1105 and the monitoring software 1106 (e.g., or some combination thereof) may have elements of the program modules and the monitoring software 1106. The monitoring data 1107 may also be stored on the mass storage device 1104. The monitoring data 1107 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 1115.

A user may enter commands and information into the computer 1101 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1103 via a human machine interface 1102 that is coupled to the bus 1113, but may be connected by other interface and bus structures, such as a parallel port, game port, an IEEE 1394 Port (also known as a Firewire port), a serial port, network adapter 1108, and/or a universal serial bus (USB).

The display device 1111 may also be connected to the bus 1113 via an interface, such as the display adapter 1109. It is contemplated that the computer 1101 may have more than one display adapter 1109 and the computer 1101 may have more than one display device 1111. The display device 1111 may be a monitor, an LCD (Liquid Crystal Display), light emitting diode (LED) display, television, smart lens, smart glass, and/or a projector. In addition to the display device 1111, other output peripheral devices may be components such as speakers (not shown) and a printer (not shown) which may be connected to the computer 1101 via the Input/Output Interface 1110. Any step and/or result of the methods may be output (or caused to be output) in any form to an output device. Such output may be any form of visual representation, including, but not limited to, textual, graphical, animation, audio, tactile, and the like. The display device 1111 and computer 1101 may be part of one device, or separate devices.

The computer 1101 may operate in a networked environment using logical connections to one or more remote computing devices 1114*a,b,c*. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1101 and a remote computing device 1114*a,b,c* may be made via a network 1115, such as a local area network (LAN) and/or a general wide area network (WAN). Such network connections may be through the network adapter 1108. The network adapter 1108 may be implemented in both wired and wireless environments. Such networking environments are conventional and commonplace in dwellings, offices, enterprise-wide computer networks, intranets, and the Internet.

Application programs and other executable program components such as the operating system 1105 are shown herein as discrete blocks, although it is recognized that such programs and components reside at various times in different storage components of the computing device 1101, and are executed by the one or more processors 1103 of the computer. An implementation of the monitoring software 1106 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
    receiving, from a first computing device at a first time, a communication that indicates a change in a bitrate associated with a first computing device request for content by the first computing device;
    receiving, from a second computing device, at a second time, a second communication that indicates a change in a bitrate associated with a second computing device request for the content by the second computing device;
    determining, based on a time difference between the first time and the second time satisfying a threshold time, an impairment associated with the first computing device request for the content and the second computing device request for the content; and
    determining, based on the impairment, at least one source of the impairment.

2. The method of claim 1, wherein the time difference satisfying the threshold time comprises the time difference between the first time and the second time being less than the threshold time.

3. The method of claim 1, further comprising determining the time difference between the first time and the second time.

4. The method of claim 1, further comprising causing, based on the impairment, at least one maintenance action, wherein the at least one maintenance action comprises at least one of: correcting equipment associated with the at least one source of the impairment, replacing the equipment associated with the at least one source of the impairment, activating an alarm, or restarting at least one system associated with the at least one source of the impairment.

5. The method of claim 1, wherein the first computing device request for the content and the second computing device request for the content are for one of a same content item or a different content item.

6. The method of claim 1, wherein the at least one source of the impairment comprises at least one of a packager of the content or an encoder of the content.

7. One or more non-transitory computer-readable media storing processor-executable instructions that, when executed by at least one processor, cause the at least one processor to:
    receive, from a first computing device at a first time, a communication that indicates a change in a bitrate associated with a first computing device request for content by the first computing device;
    receive, from a second computing device, at a second time, a second communication that indicates a change in a bitrate associated with a second computing device request for the content by the second computing device;
    determine, based on a time difference between the first time and the second time satisfying a threshold time, an impairment associated with the first computing device request for the content and the second computing device request for the content; and
    determine, based on the impairment, at least one source of the impairment.

8. The one or more non-transitory computer-readable media of claim 7, wherein the time difference satisfying the threshold time comprises the time difference between the first time and the second time being less than the threshold time.

9. The one or more non-transitory computer-readable media of claim 7, wherein the processor-executable instructions, when executed by the at least one processor, cause the at least one processor to determine the time difference between the first time and the second time.

10. The one or more non-transitory computer-readable media of claim 7, wherein the processor-executable instructions, when executed by the at least one processor, cause the at least one processor to cause, based on the impairment, at least one maintenance action, wherein the at least one maintenance action comprises at least one of: correcting equipment associated with the at least one source of the impairment, replacing the equipment associated with the at least one source of the impairment, activating an alarm, or restarting at least one system associated with the at least one source of the impairment.

11. The one or more non-transitory computer-readable media of claim 7, wherein the first computing device request for the content and the second computing device request for the content are for one of a same content item or a different content item.

12. The one or more non-transitory computer-readable media of claim 7, wherein the at least one source of the impairment comprises at least one of a packager of the content or an encoder of the content.

13. An apparatus comprising:
one or more processors; and
memory storing processor-executable instructions that, when executed by the one or more processors, cause the apparatus to:
receive, from a first computing device at a first time, a communication that indicates a change in a bitrate associated with a first computing device request for content by the first computing device;
receive, from a second computing device, at a second time, a second communication that indicates a change in a bitrate associated with a second computing device request for the content by the second computing device;
determine, based on a time difference between the first time and the second time satisfying a threshold time, an impairment associated with the first computing device request for the content and the second computing device request for the content; and
determine, based on the impairment, at least one source of the impairment.

14. The apparatus of claim 13, wherein the time difference satisfying the threshold time comprises the time difference between the first time and the second time being less than the threshold time.

15. The apparatus of claim 13, wherein the processor-executable instructions, when executed by the one or more processors, cause the apparatus to determine the time difference between the first time and the second time.

16. The apparatus of claim 13, wherein the processor-executable instructions, when executed by the one or more processors, cause the apparatus to cause, based on the impairment, at least one maintenance action, wherein the at least one maintenance action comprises at least one of: correcting equipment associated with the at least one source of the impairment, replacing the equipment associated with the at least one source of the impairment, activating an alarm, or restarting at least one system associated with the at least one source of the impairment.

17. The apparatus of claim 13, wherein the first computing device request for the content and the second computing device request for the content are for one of a same content item or a different content item.

18. The apparatus of claim 13, wherein the at least one source of the impairment comprises at least one of a packager of the content or an encoder of the content.

19. A system comprising:
a first computing device configured to:
receive, from a second computing device at a first time, a communication that indicates a change in a bitrate associated with a second computing device request for content by the second computing device;
receive, from a third computing device, at a second time, a second communication that indicates a change in a bitrate associated with a third computing device request for the content by the third computing device;
determine, based on a time difference between the first time and the second time satisfying a threshold time, an impairment associated with the second computing device request for the content and the third computing device request for the content; and
determine, based on the impairment, at least one source of the impairment;
the second computing device configured to:
send the communication; and
the third computing device configured to:
send the second communication.

20. The system of claim 19, wherein the time difference satisfying the threshold time comprises the time difference between the first time and the second time being less than the threshold time.

21. The system of claim 19, wherein the first computing device is further configured to determine the time difference between the first time and the second time.

22. The system of claim 19, wherein the first computing device is further configured to cause, based on the impairment, at least one maintenance action, wherein the at least one maintenance action comprises at least one of: correcting equipment associated with the at least one source of the impairment, replacing the equipment associated with the at least one source of the impairment, activating an alarm, or restarting at least one system associated with the at least one source of the impairment.

23. The system of claim 19, wherein the second computing device request for the content and the third computing device request for the content are for one of a same content item or a different content item.

24. The system of claim 19, wherein the at least one source of the impairment comprises at least one of a packager of the content or an encoder of the content.

* * * * *